US011986843B2

(12) United States Patent
Bartolucci et al.

(10) Patent No.: US 11,986,843 B2
(45) Date of Patent: May 21, 2024

(54) DISPENSER FOR VISCOUS PRODUCTS

(71) Applicant: The Procter & Gamble Company, Cincinnati, OH (US)

(72) Inventors: Stefano Bartolucci, Singapore (SG); Haiyan Sun, Beijing (CN); Geoffrey Allen King, Mt. Sterling, OH (US); Michael Vincent Schlasinger, Cincinnati, OH (US); Joseph Frank Clear, III, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 32 days.

(21) Appl. No.: 17/869,503

(22) Filed: Jul. 20, 2022

(65) Prior Publication Data

US 2023/0034023 A1 Feb. 2, 2023

(30) Foreign Application Priority Data

Jul. 27, 2021 (WO) ................ PCT/CN2021/108633

(51) Int. Cl.

| | |
|---|---|
| ***B05B 11/00*** | (2023.01) |
| ***B05B 11/10*** | (2023.01) |
| ***B65D 41/16*** | (2006.01) |
| ***B65D 47/18*** | (2006.01) |
| *A45D 34/04* | (2006.01) |
| *A45D 40/26* | (2006.01) |

(52) U.S. Cl.

CPC ...... *B05B 11/1026* (2023.01); *B05B 11/1043* (2023.01); *B05B 11/1059* (2023.01); *B65D 41/16* (2013.01); *B65D 47/18* (2013.01); *A45D 34/045* (2013.01); *A45D 40/265* (2013.01)

(58) Field of Classification Search

CPC ............. B05B 11/1026; B05B 11/1043; B05B 11/1059; B65D 41/16; B65D 47/18; A45D 34/045; A45D 40/265

See application file for complete search history.

(56) References Cited

U.S. PATENT DOCUMENTS

| | | |
|---|---|---|
| 8,403,008 B2 | 3/2013 | Bouix et al. |
| 9,221,048 B2 | 12/2015 | Duquet et al. |

(Continued)

FOREIGN PATENT DOCUMENTS

| | | |
|---|---|---|
| CN | 201482492 U | 5/2010 |
| CN | 106742646 A | 5/2017 |

(Continued)

OTHER PUBLICATIONS

PCT Search Report and Written Opinion for PCT/CN2021/108633 dated Jan. 20, 2022,12 pages.

(Continued)

*Primary Examiner* — Frederick C Nicolas

(74) *Attorney, Agent, or Firm* — Alexandra S. Anoff

(57) ABSTRACT

A product dispenser with a reservoir for a product and a cap. The cap has a first assembly and a second assembly. The first assembly can include a button configured to dispense the product through a lower end orifice of the pipette, when the button is actuated. The second assembly can include a pipette rigidly connected and in fluidic communication with a chamber configured to change its volume depending on the movement of the first assembly relative to the second assembly and the movement of the button.

10 Claims, 25 Drawing Sheets

(56) References Cited

U.S. PATENT DOCUMENTS

| | | | |
|---|---|---|---|
| 9,833,801 B2 | 12/2017 | Noel et al. | |
| 10,143,623 B2 * | 12/2018 | Suzuki | A61M 5/3202 |
| 10,786,066 B2 | 9/2020 | Kim et al. | |
| 11,596,937 B2 * | 3/2023 | Bartolucci | B65D 47/06 |
| 2009/0269229 A1 | 10/2009 | Yeo | |
| 2013/0074983 A1 | 3/2013 | Choi | |
| 2014/0234007 A1 | 8/2014 | Lee | |
| 2015/0144663 A1 | 5/2015 | Noel et al. | |
| 2015/0232240 A1 | 8/2015 | Lee et al. | |
| 2015/0320175 A1 | 11/2015 | Lee | |
| 2017/0216141 A1 | 8/2017 | Suzuki et al. | |
| 2021/0060544 A1 | 3/2021 | Bartolucci et al. | |
| 2021/0368963 A1 | 12/2021 | Hwang | |

FOREIGN PATENT DOCUMENTS

| | | | |
|---|---|---|---|
| CN | 110170347 | A | 8/2019 |
| EP | 3001927 | A1 | 4/2016 |
| EP | 2995570 | B1 | 2/2019 |
| JP | 2015532627 | A | 11/2015 |
| JP | 2016088556 | A | 5/2016 |
| KR | 102011701 | B1 | 8/2019 |
| WO | 2012136938 | A1 | 10/2012 |
| WO | 2016055388 | A1 | 4/2016 |

OTHER PUBLICATIONS

All Office Actions, U.S. Appl. No. 17/010,502, filed Sep. 2, 2020.

* cited by examiner

DISPENSER FOR VISCOUS PRODUCTS

FIELD OF THE INVENTION

The present invention relates to a product dispenser, comprising: (A) a reservoir for a product, having a cap fastening mechanism; (B) a cap having the following (B-1) to (B-3): (B-1) a first assembly having: a housing for a sealing element; a chamber volume controlling mechanism; and a button configured to dispense the product through a lower end orifice of the pipette, when the button is actuated; (B-2) a second assembly having: a pipette having an upper end orifice and a lower end orifice, and rigidly connected and in fluidic communication with a chamber; a sealing element configured to seal relative to the housing, and to slide between a high position and a low position in the housing; a corresponding fastening mechanism to the cap fastening mechanism of the reservoir; (B-3) a chamber configured to change its volume depending on the movement of the first assembly relative to the second assembly and the movement of the button, wherein when the cap is in a closed position, the sealing element is located at a higher position relative to the housing, wherein a movement of the cap in a direction of opening the product dispenser causes the housing to move up relatively to the sealing element via the chamber volume controlling mechanism, so that the sealing element slides from the higher to the lower position in the housing and the volume of the chamber increases, wherein this increase of the chamber volume causes a suction of the product in the pipette, wherein when the sealing element reaches to the lower position in the housing, a further movement of the cap in the direction of opening causes the corresponding fastening mechanism of the cap to disengage from the cap fastening mechanism of the reservoir, and wherein when the button is actuated, the volume of the chamber decreases by which the product is dispensed from the pipette.

BACKGROUND OF THE INVENTION

A dispenser provided with a reservoir and a pipette fixed to a cap which has a push button for dispensing the product is known. A coil spring or an elastically deformable diaphragm allows product to be sucked into the pipette. However, depending on the dispenser structure and/or how strongly the product is sucked and dispensed, the amount of the dispensed product can be easily varied in such dispensers. Thus, there is a need to provide dispensers of viscous products with improved precision in dispensing.

Alternatively, dispensers to automatically fill the pipette with products has been proposed. For example, Chanel's US patent application publication No. 2015144663 A discloses a dispenser for viscous products, including: a container for a product, a sealing cap designed to be screwed onto the container, a pipette, and a piston capable of causing a suction of the product into the pipette, the dispenser being arranged such that, when the cap is screwed onto the container, the unscrewing of the cap in the direction of opening of the dispenser causes, by itself, a movement of the piston producing the suction.

However, the inventor of the present invention has found a need to provide a different dispenser structure from that disclosed in the above Chanel's US patent publication, for at least one of the followings:

dispensing a larger dose per stroke; and reducing the number of pieces used in the structure, by which the dispenser may provide improved stability in: sealing functions; and/or piston movements.

There is also a need to provide such dispensers without using plastic springs or bellows in view of prevention of failure of piston movement caused by creep/fatigue. Dispensers without any metal parts such as metal coil spring may also be desired in view of easiness to recycle plastic materials used in other parts of the dispenser. This enables material selection allowing the dispenser to be recycled according to one SPI class wherein each of the components is selected from the group consisting of a single class of recyclable materials as defined by the Society of the Plastics Industry.

Thus, there is a need for providing dispensers to meet at least one of the aforementioned needs.

SUMMARY OF THE INVENTION

The present invention is related to a product dispenser, comprising:

(A) a reservoir for a product, having a cap fastening mechanism, (B) a cap having the following (B-1) to (B-3):

(B-1) a first assembly having:
- a housing for a sealing element;
- a chamber volume controlling mechanism; and
- a button configured to dispense the product through a lower end orifice of the pipette, when the button is actuated;

(B-2) a second assembly having:
- a pipette having an upper end orifice and a lower end orifice, and rigidly connected and in fluidic communication with a chamber;
- a sealing element configured to seal relative to the housing, and to slide between a high position and a low position in the housing
- a corresponding fastening mechanism to the cap fastening mechanism of the reservoir;

(B-3) a chamber configured to change its volume depending on the movement of the first assembly relative to the second assembly and the movement of the button;

wherein when the cap is in a closed position, the sealing element is located at a higher position relative to the housing, wherein a movement of the cap in a direction of opening the product dispenser causes the housing to move up relatively to the sealing element via the chamber volume controlling mechanism, so that the sealing element slides from the higher to the lower position in the housing and the volume of the chamber increases, wherein this increase of the chamber volume causes a suction of the product in the pipette, wherein when the sealing element reaches to the lower position in the housing, a further movement of the cap in the direction of opening causes the corresponding fastening mechanism of the cap to disengage from the cap fastening mechanism of the reservoir, wherein when the button is actuated, the volume of the chamber decreases by which the product is dispensed from the pipette.

This invention provides at least one of the followings:

improved precision in dispensing;

dispense of a larger dose per stroke;

improved stability in: sealing functions; and/or piston movements, due to reduced number of pieces used in the structure;

prevention of failure of piston movement caused by creep/fatigue, due to non-use of plastic springs or bellows;

easiness of recycling due to non-use of metal coil springs and being made from materials which can go into a single recycling stream having a single class of materials, as defined by the Society of Plastics Industry.

DETAILED DESCRIPTION OF THE INVENTION

Dispenser

Figure 1:
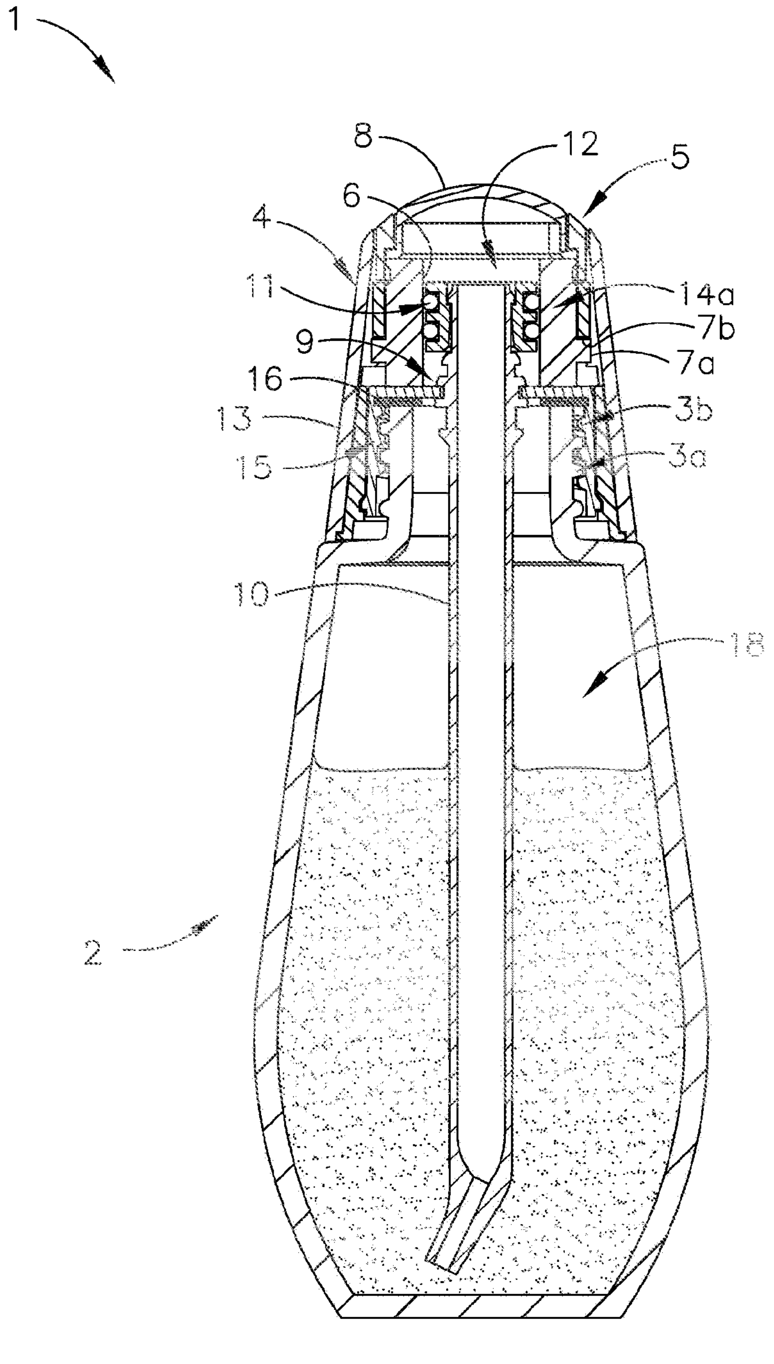
FIG. 1 illustrates a longitudinal cross-sectional view of a dispenser according to the first embodiment of the present invention, in a cap-closed position.
Figure 2:
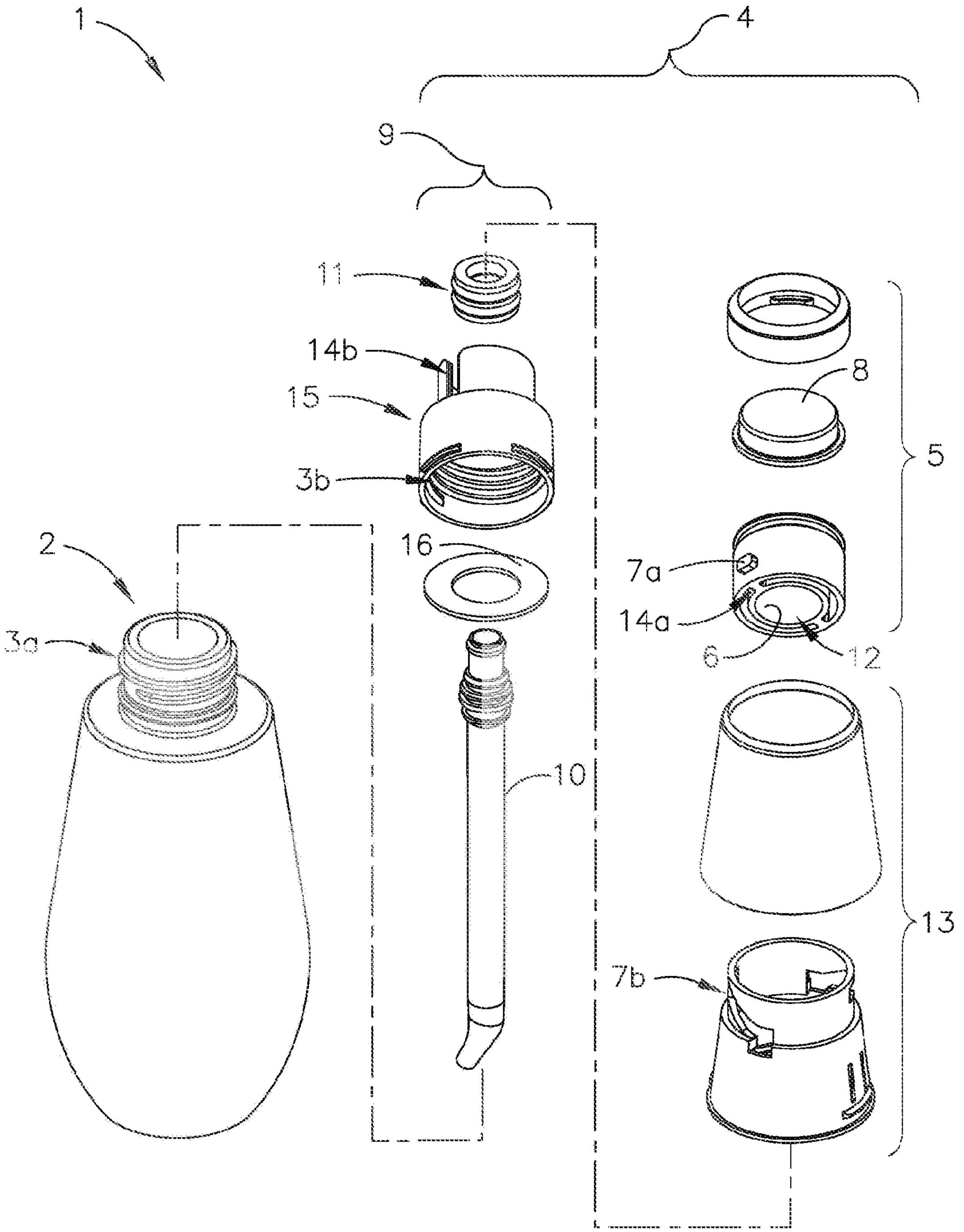
FIG. 2 illustrates an exploded perspective view of the dispenser of FIG. 1.

The present invention relates to a product dispenser (1), comprising:

(A) a reservoir (2) for a product, having a cap fastening mechanism (3*a*), (B) a cap (4) having the following (B-1) to (B-3):

(B-1) a first assembly (5) having:

a housing (6) for a sealing element (11);

a chamber volume controlling mechanism (7*a*); and a button (8) configured to dispense the product through a lower end orifice of the pipette (10), when the button (8) is actuated;

(B-2) a second assembly (9) having:

a pipette (10) having an upper end orifice and a lower end orifice, and rigidly connected and in fluidic communication with a chamber (12);

a sealing element (11) configured to seal relative to the housing (6), and to slide between a high position and a low position in the housing (6)

a corresponding fastening mechanism (3*b*) to the cap fastening mechanism of the reservoir;

(B-3) a chamber (12) configured to change its volume depending on the movement of the first assembly (5) relative to the second assembly (9) and the movement of the button (8);

wherein when the cap (4) is in a closed position, the sealing element (11) is located at a higher position relative to the housing (6), wherein a movement of the cap (4) in a direction of opening the product dispenser causes the housing (6) to move up relatively to the sealing element (11) via the chamber volume controlling mechanism (7*a*), so that the sealing element (11) slides from the higher to the lower position in the housing (6) and the volume of the chamber (12) increases, wherein this increase of the chamber volume causes a suction of the product in the pipette (10), wherein when the sealing element (11) reaches to the lower position in the housing (6), a further movement of the cap (4) in the direction of opening causes the corresponding fastening mechanism (3*b*) of the cap to disengage from the cap fastening mechanism (3*a*) of the reservoir (2), and wherein when the button (8) is actuated, the volume of the chamber (12) decreases by which the product is dispensed from the pipette (10).

In some examples, when the housing (6) in the first assembly (5) is moved up relatively to the sealing element (11) in the second assembly (9), the second assembly (9) has no vertical displacement relatively to the reservoir. This assures that, during sucking up the product, the position of the pipette (10) doesn't change relative to the bottle, thus the pipette (10) always sucks-up the product consistently with the pipette lower end orifice positioned at a minimal distance from the bottle inside bottom surface, i.e. at an optimal position and without any relative motion during product loading. This prevents the intrusion of any air bubble, and also ensures that the pipette (10) is properly filled at the time the users picks the cap and dispenses.

Some of the parts, mechanisms, features and elements described above and below can be integrated into one piece.

Cap Fastening Mechanism

The reservoir (2) has a cap fastening mechanism (3*a*), and the cap (4) has a corresponding fastening mechanism (3*b*) configured to engage with the cap fastening mechanism on the reservoir. The cap fastening mechanism and the corresponding fastening mechanism can be anything, for example, screw threads and bayonet connecter, and in some examples can be screw threads in view of preventing leakages and/or drop of the cap from the reservoir especially during transportation. The cap fastening mechanism (3*a*) at the reservoir (2) engages with the corresponding fastening mechanism (3*b*) at the cap (4) in a cap-closed position and a loading position, and disengages in a cap-open position.

In some examples, the second assembly (9) further comprises a cap insert (15). The cap insert (15) can have the corresponding fastening mechanism (3*b*). The corresponding fastening mechanism can be a threaded connection. The cap insert (15) can also include a gasket (16) to seal on the reservoir in the cap-closed position. The cap insert can have a platform with a central hollow section to allow the pipette (10) through so that the pipette (10) can be in fluidic communication between the reservoir inner volume (18) and the chamber (12). The cap insert platform and the pipette outer wall can be mechanically biased by an annular snap fit to ensure the two components are (vertically) axially constrained.

Sealing Element

The sealing element (11) can be a piston. The piston can include a hollow section to let the pipette (10) through so the pipette (10) can be in fluidic communication between the reservoir inner volume (18) and the chamber (12). The piston and the pipette outer wall can be mechanically biased by an annular snap fit to ensure the two components are (vertically) axially constrained. The piston can include one or more o-rings or sealing flanges interfering with the housing such to both provide a sliding seal with the product if the product comes into the chamber as well as low sliding force. The piston and cap insert can be made in one piece.

Chamber Volume Controlling Mechanism

The first assembly (5) can have a chamber volume controlling mechanism (7*a*). The cap (4) can further comprise an outer cover (13), and in some examples a corresponding chamber volume controlling mechanism (7*b*) can be included in either the outer cover (13) or the second assembly (9). This mechanism controls the relative motion of the first and second assembly (5, 9), more specifically the relative motion of the housing (6) and the sealing element (11) during the dosage loading stage i.e. when the chamber (12) varies the volume.

The chamber volume controlling mechanism (7*a*) and corresponding mechanism (7*b*) can be anything. In some examples, that the corresponding mechanism (7*b*) is a rotatory sleeve or barrel with a rail and the chamber volume controlling mechanism (7*a*) is a follower engaging with the rail and the rail can have a lower end and higher end.

Locking Feature

In the present invention, when the sealing element (11) reaches to the lower position in the housing (6), the first and second assemblies (5, 9) are mechanically biased such that the first and second assemblies (5, 9) to move together upon a further movement of the cap (4) in the direction of opening.

This configuration can be anything, and in some examples can include a locking feature (14*a*). For example, the first assembly (5), preferably housing (6) has the locking feature (14*a*). Corresponding locking feature (14*b*) can be included in the second assembly (9), preferably, cap insert (15). In one of the embodiments, for example, the second assembly (9), preferably cap insert (15) has one or more cams in the outer wall, and the housing (6) has one or more follower beads engaging said cams, said cams include locking slots, such that a movement of the cap (4) in the direction of the opening results in the follower bead(s) as the locking feature (14*a*) to engage the locking slot(s) as the corresponding locking feature (14*b*).

Button

The button material can be inert and compatible with the product formulation and have a low moisture vapor transmission rate (MVTR) to minimize water loss from the product and extend the usable life of the product.

The button can be realized out of compliant materials both able to easily deform when pressed as well as having sufficiently strong bounce back to recover its original position. In some examples, the button can be made of an elastic material such that pressing of the button temporarily reduces the volume of the chamber by which the product can be dispensed from the pipette, and after stop pressing, the button and chamber restore to their original figure/position.

In some examples, the button can be made in NBR (nitrile butadiene rubber), SBR (styrene-butadiene rubber), EPDM (ethylene propylene diene monomer), and/or TPE (thermoplastic elastomers). More preferably the button can be made of an elastomer material compatible with the PP (polypropylene) recycling stream such as the Milastomer™ (W600NS) commercialized by Mitsui Chemicals.

The button may have a valve to release air when the piston moves from a lower position to a higher position in the housing.

Chamber

The chamber (12) is a space which can be formed by the button (8), housing (6), sealing element (11), and with or without the upper end orifice of the pipette (10).

Pipette

The pipette (10) has an elongate body with a tubular shape to store the liquid to dispense and a lower end orifice to suck the product during loading and release the liquid during activation of the button (8). The lower end can be tapered to form a reduction in section which makes it possible to retain the liquid in the pipette especially when the pipette is out of the reservoir. The lower end of the pipette can be bent to improve the product intake and release. The pipette (10) also has an upper end orifice to open to the chamber (12).

Materials and Free of Coil Spring or Bellows

In some examples, all materials used in this dispenser can be recycling plastic and/or compatible with the plastic recyclable stream.

In some examples, the chamber volume can change without coil spring or bellows. In one example, the dispenser can be free of coil spring and bellows. By this, the mechanism housed in the cap is simplified, the number of components is reduced, the manufacturing of the dispenser is less expensive, and the assembly thereof is less complex. Further this design makes the cap easy to be recycled, especially allows the cap to be mechanically recycled. Metal coil springs typically included in dispensers are generally considered incompatible with the mechanical recycling process. Plastic coil springs and bellows could lead to designs compatible with mechanical recycling. However, plastic coil springs and bellows are found to cause dosage inconsistency due the inevitable creep and fatigue experienced both during storage and cycling load during usage.

Viscous Product

The invention relates to a dispenser for viscous products such as gel, lotion, serum or essences, particularly useful in the field of beauty care products such as skin care and hair care. For example, the viscous product has a viscosity of between 5,000 and 35,000 centipoise, alternatively between 10,000 and 20,000 centipoise (viscosity measured with the aid of a Brookfield LVT viscometer equipped with a spindle and rotating at a speed of three rotations per minute).

EXAMPLES

First Embodiment

FIG. 1-FIG. 8 illustrate one embodiment of the dispenser (1) of the present invention (hereinafter "first embodiment"). In this and other embodiments, the dispenser and most of its components have an overall shape which is symmetrical about an axis of the dispenser, but in other embodiments which are not illustrated herein, some components for example, cover, bottle and/or pipette may not be symmetrical.

The product dispenser (1) of this first embodiment comprises:

(A) a reservoir (2) for a product, having a cap fastening mechanism (3*a*), (B) a cap (4) having the following (B-1) to (B-3):

(B-1) a first assembly (5) having:

a housing (6) for a sealing element (11);

a chamber volume controlling mechanism (7*a*); and a button (8) configured to dispense the product through a lower end orifice of the pipette (10), when the button is actuated;

(B-2) a second assembly (9) having:

a pipette (10) having an upper end orifice and a lower end orifice, and rigidly connected and in fluidic communication with a chamber (12);

a sealing element (11) configured to seal relative to the housing (6), and to slide between a high position and a low position in the housing (6)

a corresponding fastening mechanism (3*b*) to the cap fastening mechanism of the reservoir;

(B-3) a chamber (12) configured to change its volume depending on the movement of the first assembly (5) relative to the second assembly (9) and the movement of the button (8);

(B-4) an outer cover (13) having a corresponding chamber volume controlling mechanism (7*b*) which is a rotatory sleeve with one or more rails in this first embodiment, and wherein the chamber volume controlling mechanism (7*a*) is one or more follower engaging with each respective rail.

Figure 3:
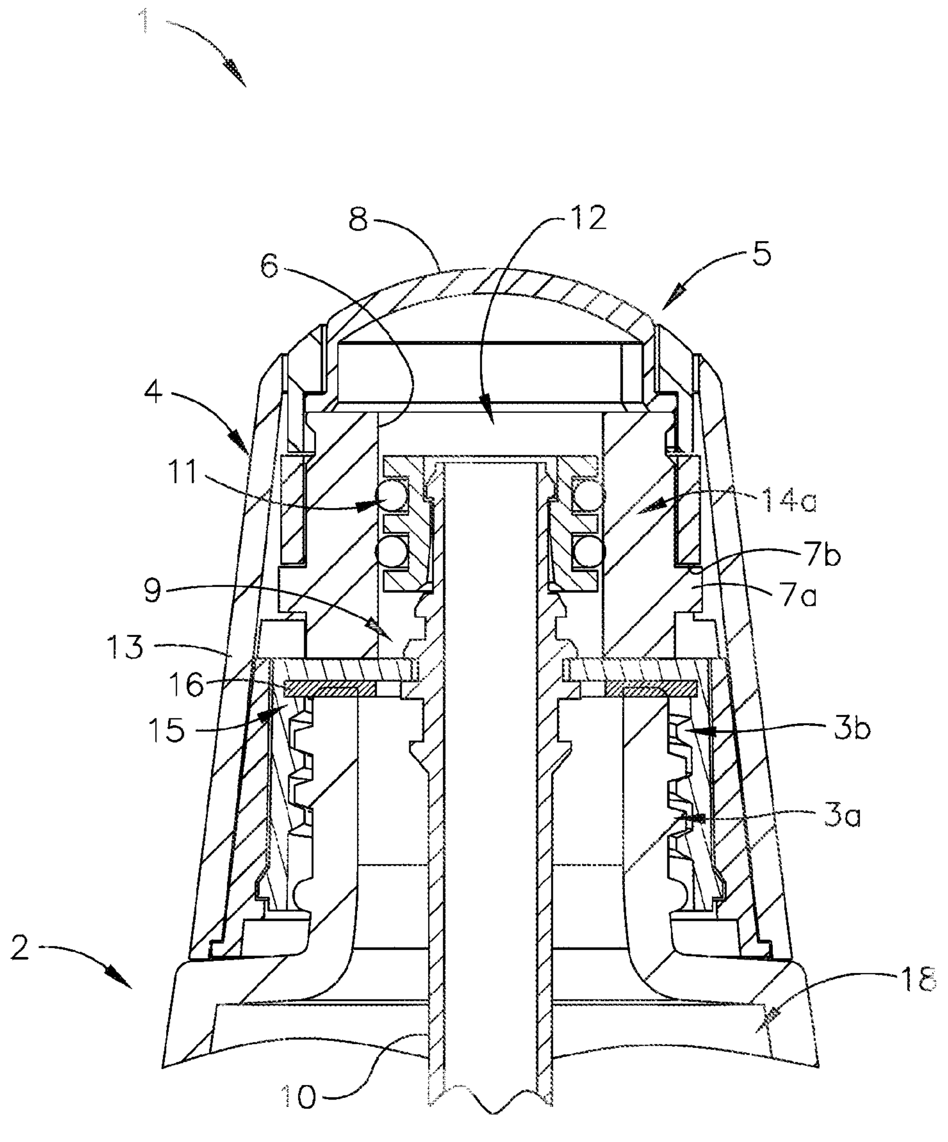
FIG. 3 illustrates a longitudinal cross-sectional view of the dispenser of FIG. 1, focusing on cap, in cap-closed position.

As shown in FIG. 1 and FIG. 3, when the cap (4) is in a closed position, the sealing element (11) is located at a higher position relative to the housing (6).

Figure 4:
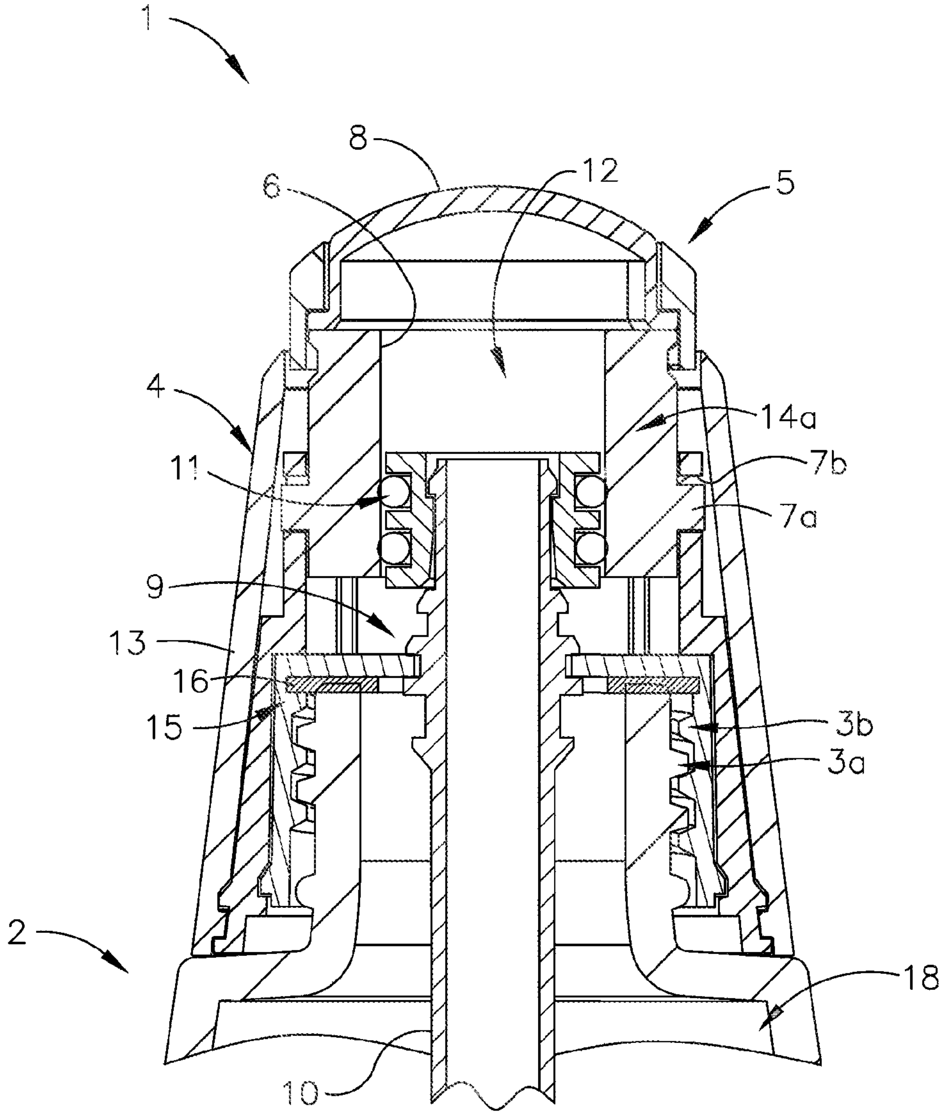
FIG. 4 illustrates a longitudinal cross-sectional view of the dispenser of FIG. 1, focusing on cap, in a loading position.
Figure 7:
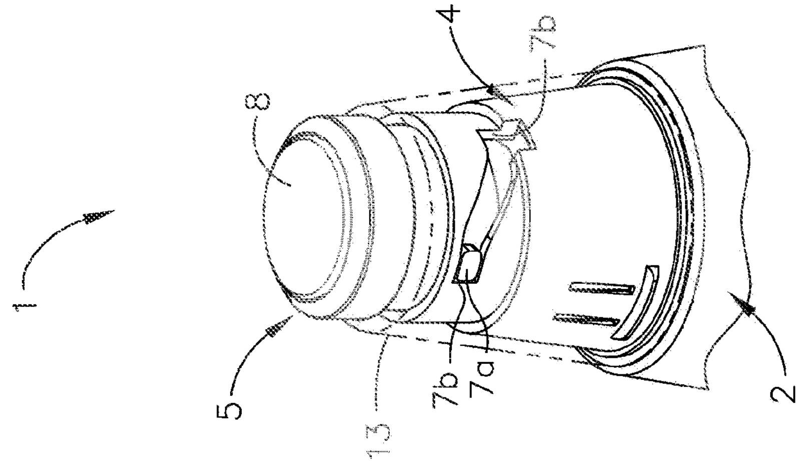

As shown in FIG. 4 and FIG. 7, a movement of the cap (4) in a direction of opening the product dispenser, which is a rotation of the outer cover (13) in this first embodiment, causes the housing (6) to move up relatively to the sealing element (11) via the chamber volume controlling mechanism (7*a*), so that the sealing element (11) slides from the higher to the lower position in the housing (6) and the volume of the chamber (12) increases, wherein this increase of the chamber volume causes a suction of the product in the pipette (10). When the housing (6) in the first assembly (5) is moved up relatively to the sealing element (11) in the second assembly (9), the second assembly (9) has no vertical displacement relatively to the reservoir.

Figure 5:
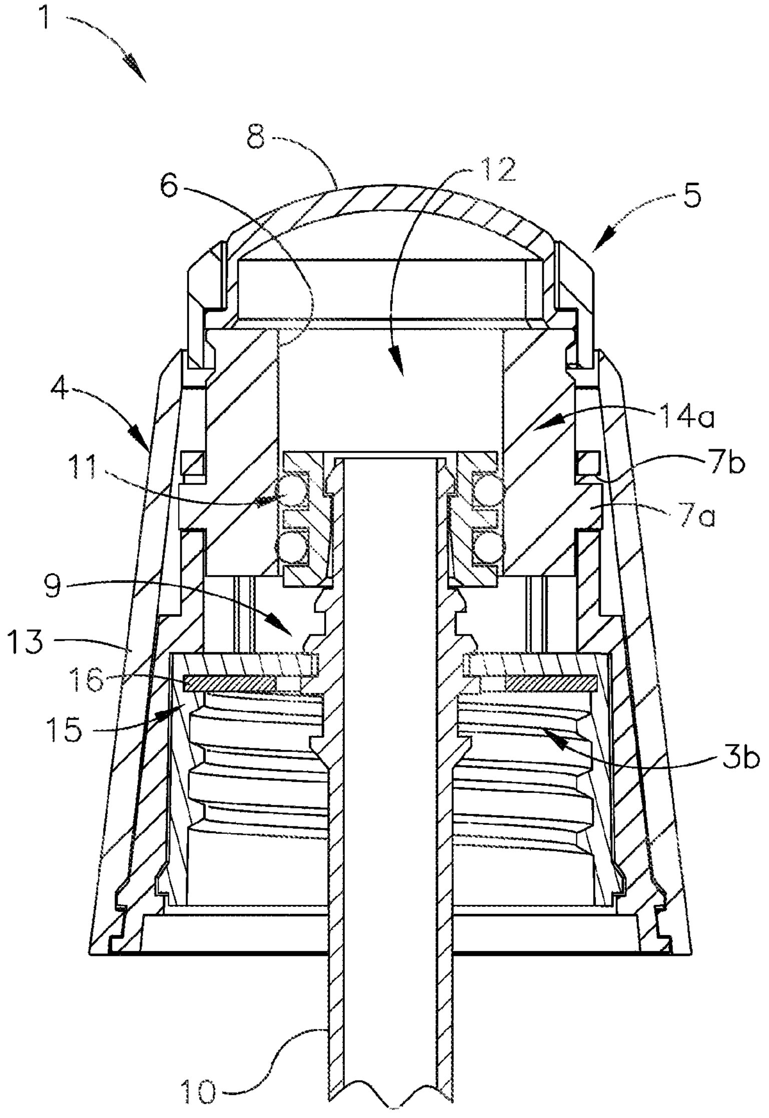
FIG. 5 illustrates a longitudinal cross-sectional view of the dispenser of FIG. 1, focusing on cap, in a cap-open position.
Figure 6:
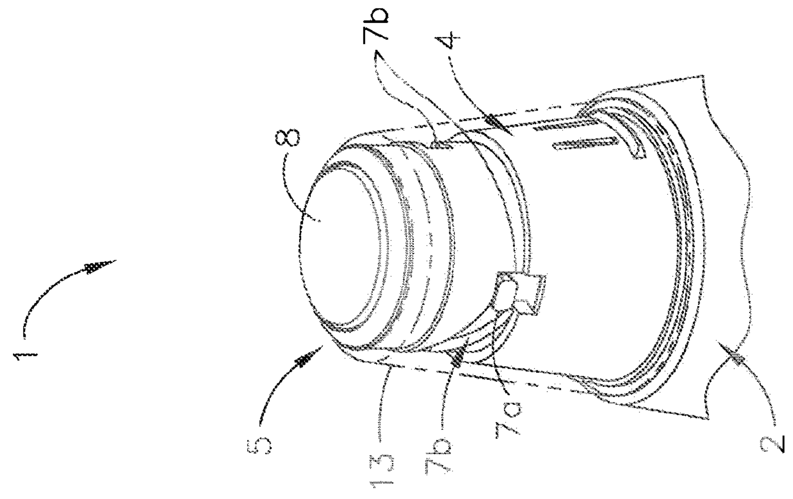
FIGS. 6-8 illustrate transparent views of the cap focusing on the locking feature, corresponding to different operation stages of the dispenser explained in FIGS. 3-5.
Figure 8:
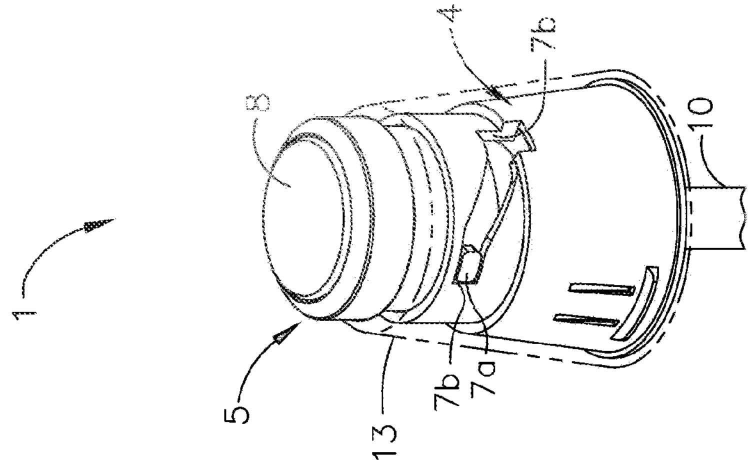

As shown in FIG. 5 and FIG. 8, wherein when the sealing element (11) reaches to the lower position in the housing (6), the first and second assemblies (5, 9) are mechanically biased such that the first and second assemblies (5, 9) move together upon a further movement of the cap (4) in the direction of opening which is further rotation of the outer cover (13) in this first embodiment.

As shown in FIG. 5 and FIG. 8, a further movement of the cap (4) in the direction of opening causes the corresponding fastening mechanism (3*b*) of the cap to disengage from the cap fastening mechanism (3*a*) of the reservoir.

When the button (8) is actuated, the volume of the chamber (12) decreases by which the product is dispensed from the pipette (10).

In this embodiment, the second assembly (9) further comprises a cap insert (15) having the corresponding cap fastening mechanism (3*b*) wherein such corresponding cap fastening mechanism is a threaded connection. The cap insert (15) includes a gasket (16) to seal on the reservoir (2) in the cap-closed position. The cap insert (15) includes a central hollow section to allow the pipette (10) through so that the pipette (10) can be in fluidic communication between the reservoir inner volume (18) and the chamber (12).

In this embodiment, the cap insert (15) outer wall includes a corresponding locking feature (14*b*) and the housing (6) includes a locking feature (14*a*). The corresponding locking feature (14*b*) can be one or more slots. The locking feature (14*a*) can be one or more ribs or keys built between the housing inner and outer wall. This locking feature (14*a*) allows the first assembly (5) to move vertically relatively to the second assembly (9) during the loading. Once the follower which is the chamber volume controlling mechanism (7*a*) has reached the end position in its respective rail which is the corresponding chamber volume controlling mechanism (7*b*) (at the end of the loading), the locking feature (14*a*) and corresponding locking feature (14*b*) assures that the first and second assembly (5, 9) are mechanically biased such that a further rotation of the outer cover (13) relatively to the reservoir (2) causes the corresponding cap fastening mechanism (3*b*) to disengage from the cap fastening mechanism (3*a*) of the reservoir (2).

Figure 9:
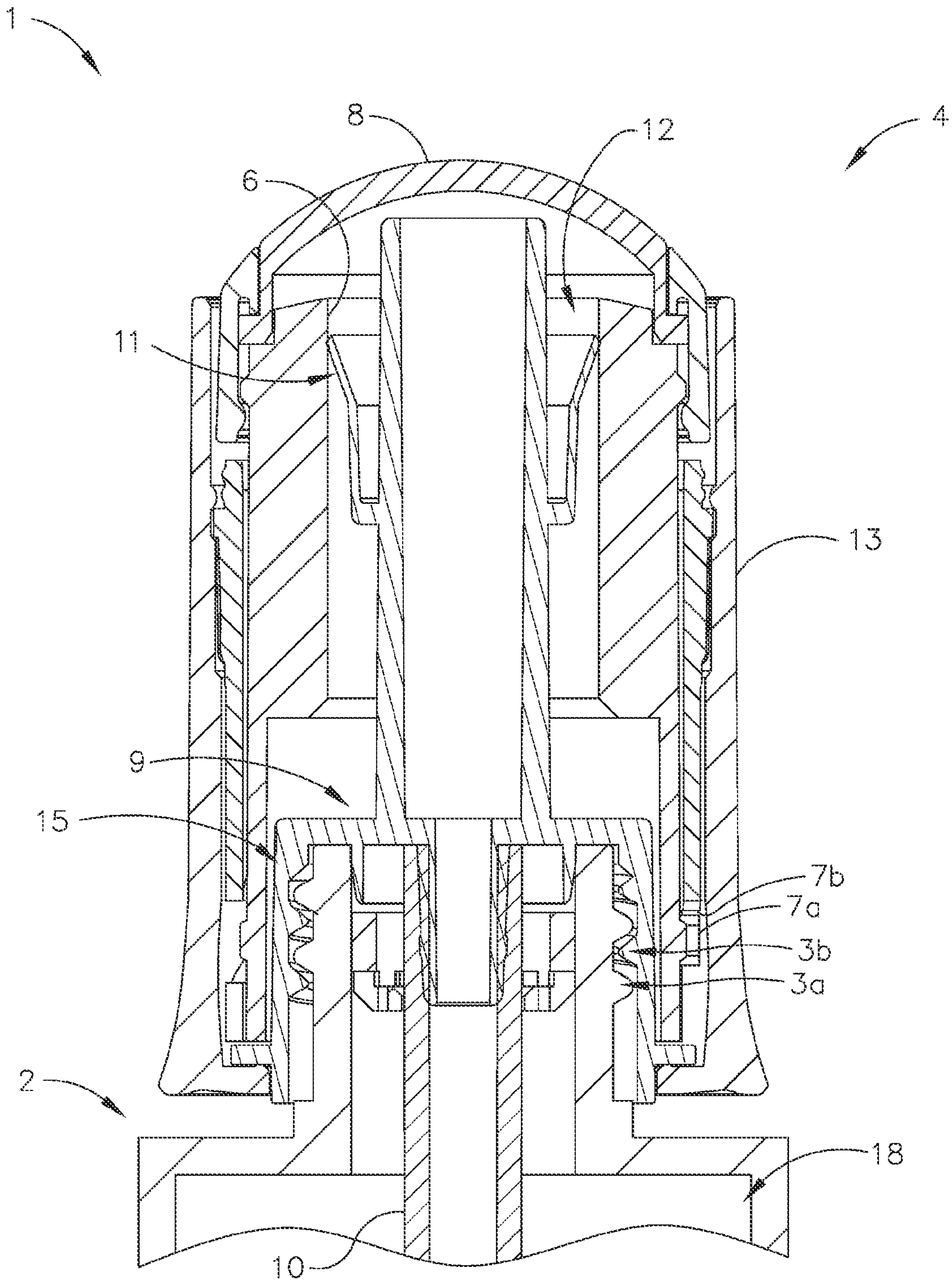
FIG. 9 illustrates a longitudinal cross-sectional view of a dispenser with an alternative structure according to the first embodiment of the present invention, in a cap-closed position.
Figure 10:
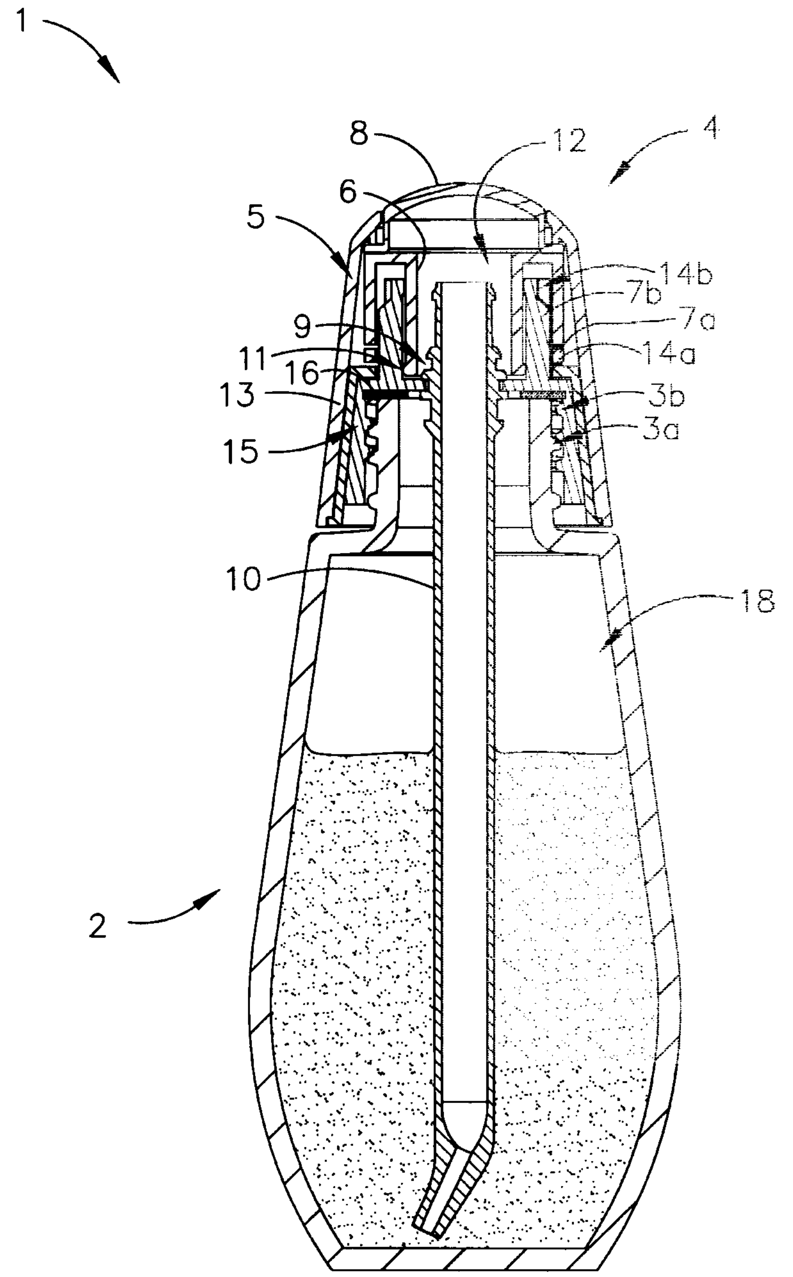
FIG. 10 illustrates a longitudinal cross-sectional view of a dispenser according to the second embodiment of the present invention, in a cap-closed position.
Figure 11:
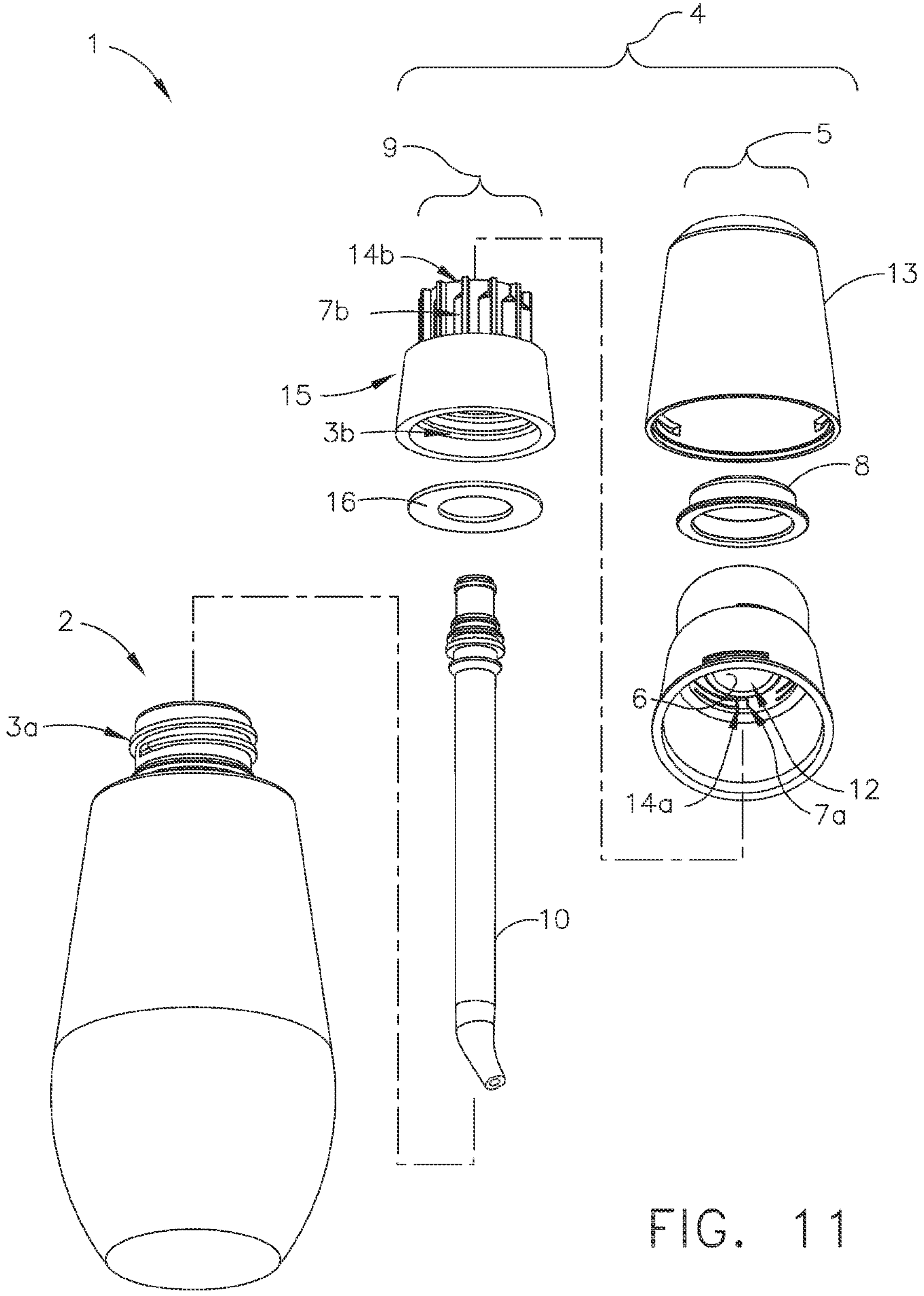
FIG. 11 illustrates an exploded perspective view of the dispenser of FIG. 10.
Figure 12:
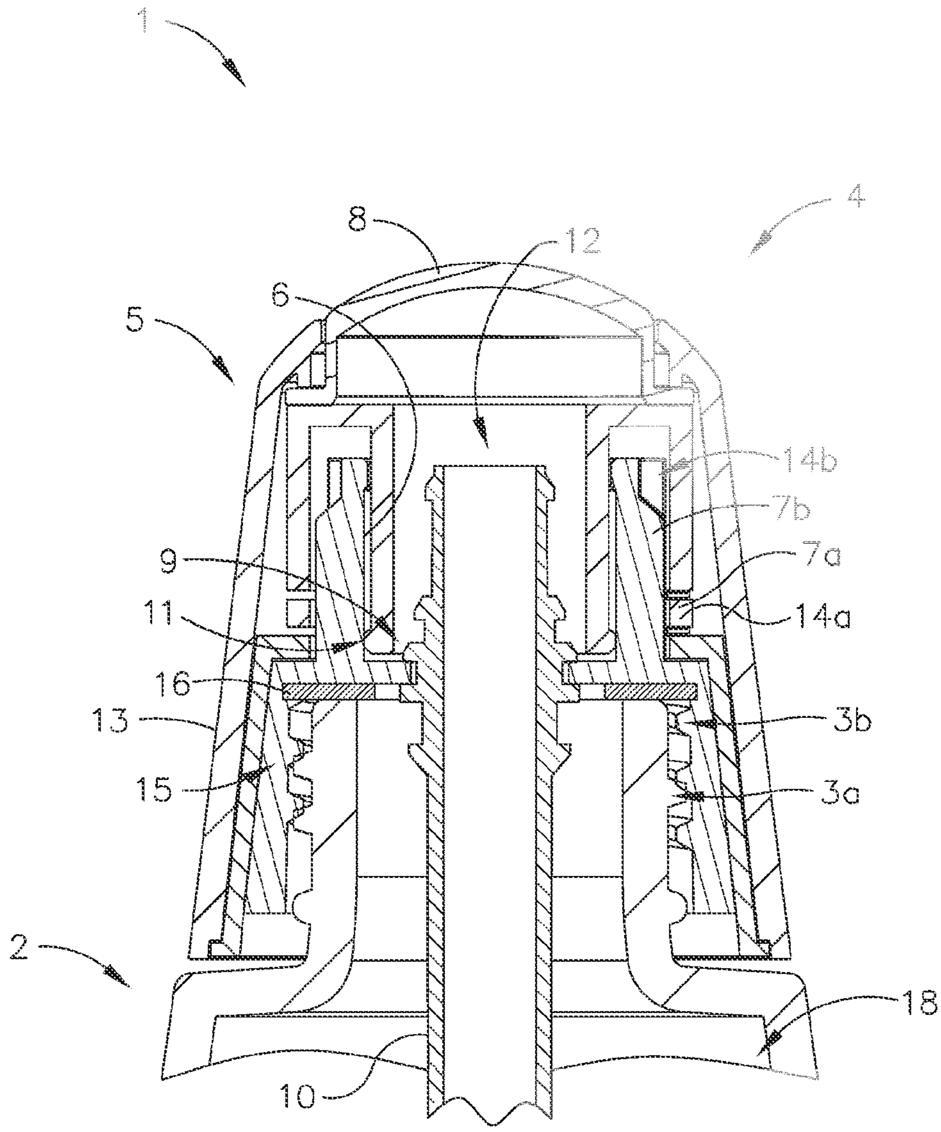
FIG. 12 illustrates a longitudinal cross-sectional view of the dispenser of FIG. 10, focusing on cap, in cap-closed position.

FIG. 9 shows a dispenser (1) with an alternative structure according to the first embodiment of the present invention, in a cap-closed position.

Second Embodiment

FIG. 10-FIG. 17 illustrate one embodiment of the dispenser (1) of the present invention (hereinafter "second embodiment").

In this second embodiment, the cap fastening mechanism (3*a*) and corresponding fastening mechanism (3*b*) are screw threads.

In this second embodiment, the corresponding chamber volume controlling mechanism (7*b*) is a rachet in the second assembly (9) especially in the cap insert (15), and the chamber volume controlling mechanism (7*a*) is one or more pawl(s) engaging with the rachet.

Figure 13:
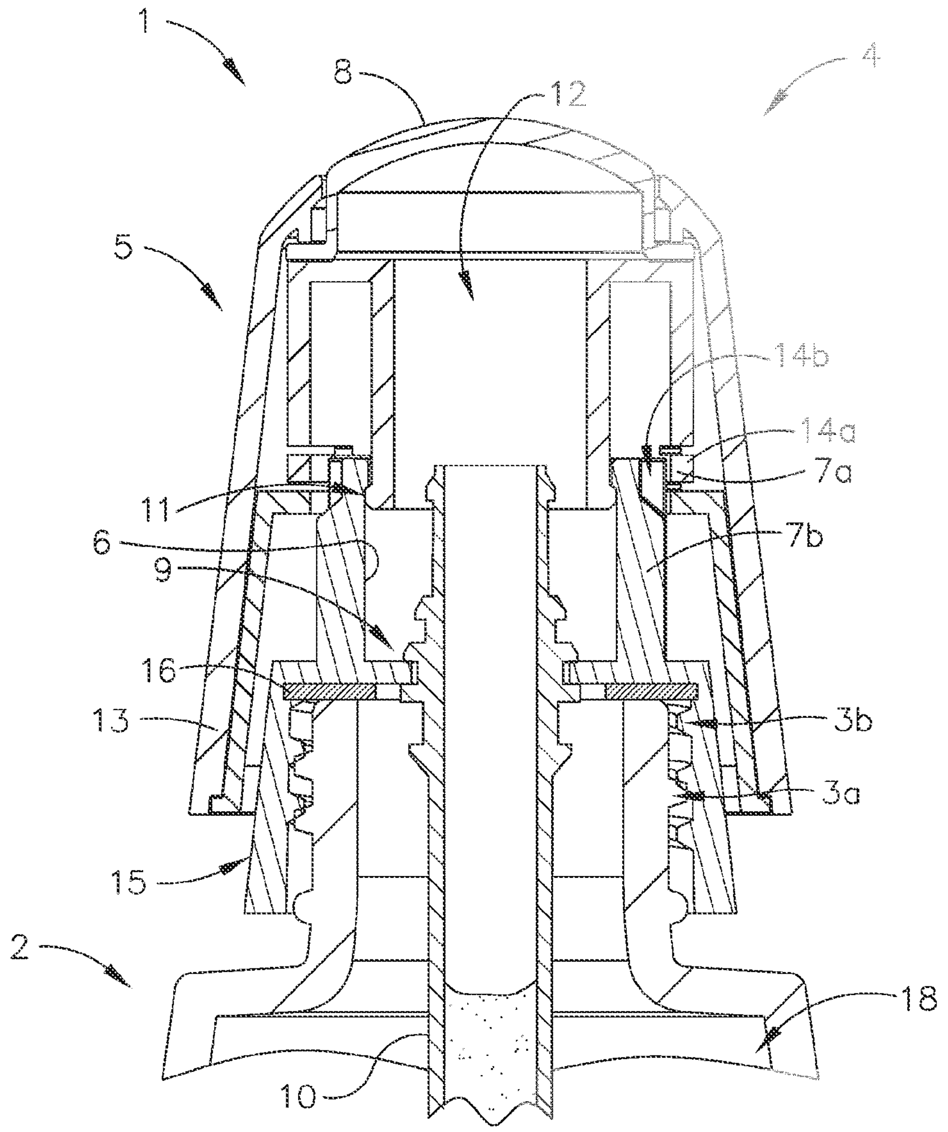
FIG. 13 illustrates a longitudinal cross-sectional view of the dispenser of FIG. 10, focusing on cap, in a loading position.
Figure 16:
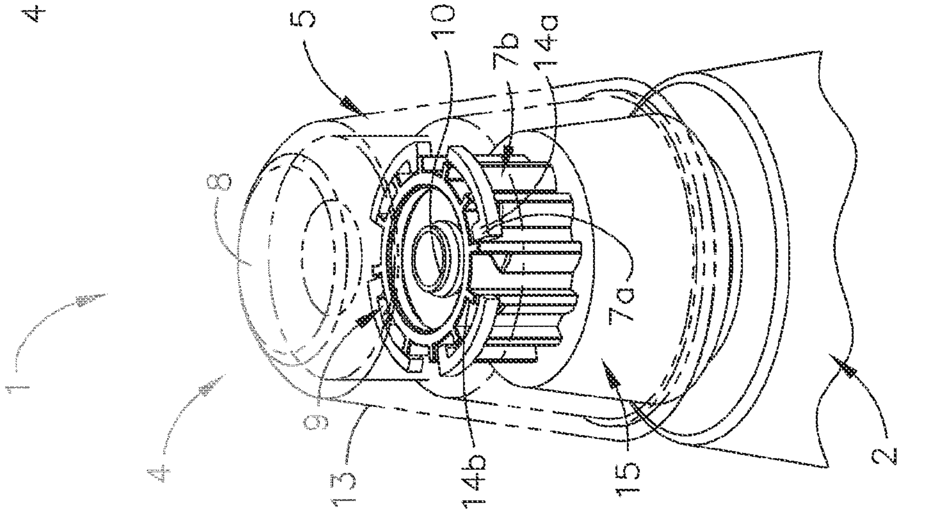
Figure 15:
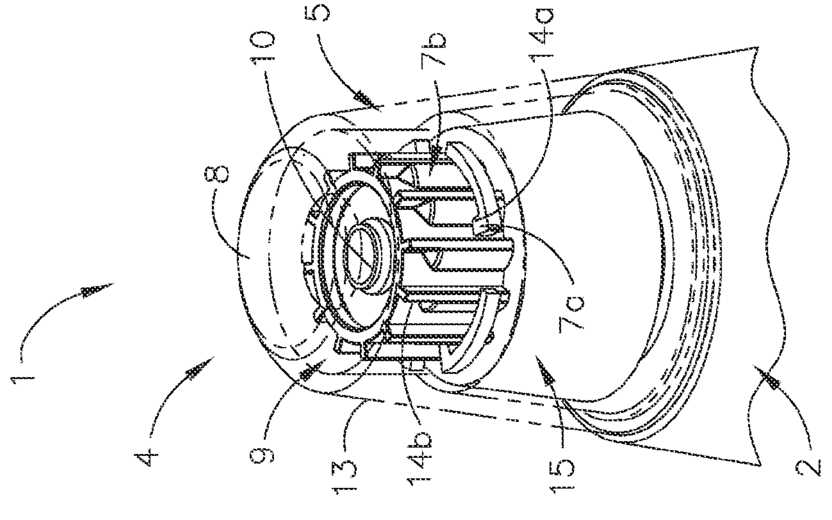
Figure 18:
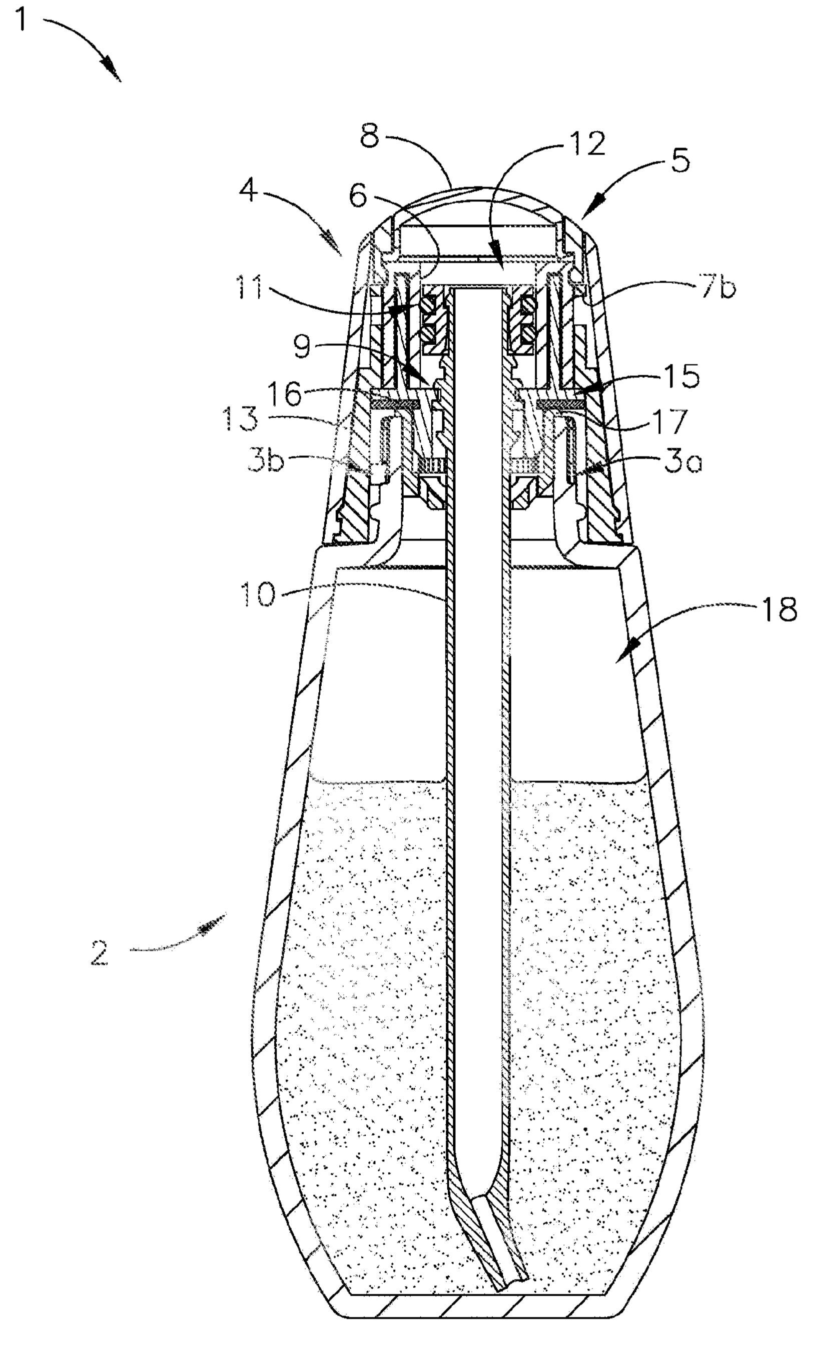
FIG. 18 illustrates a longitudinal cross-sectional view of a dispenser according to the third embodiment of the present invention, in a cap-closed position.
Figure 19:
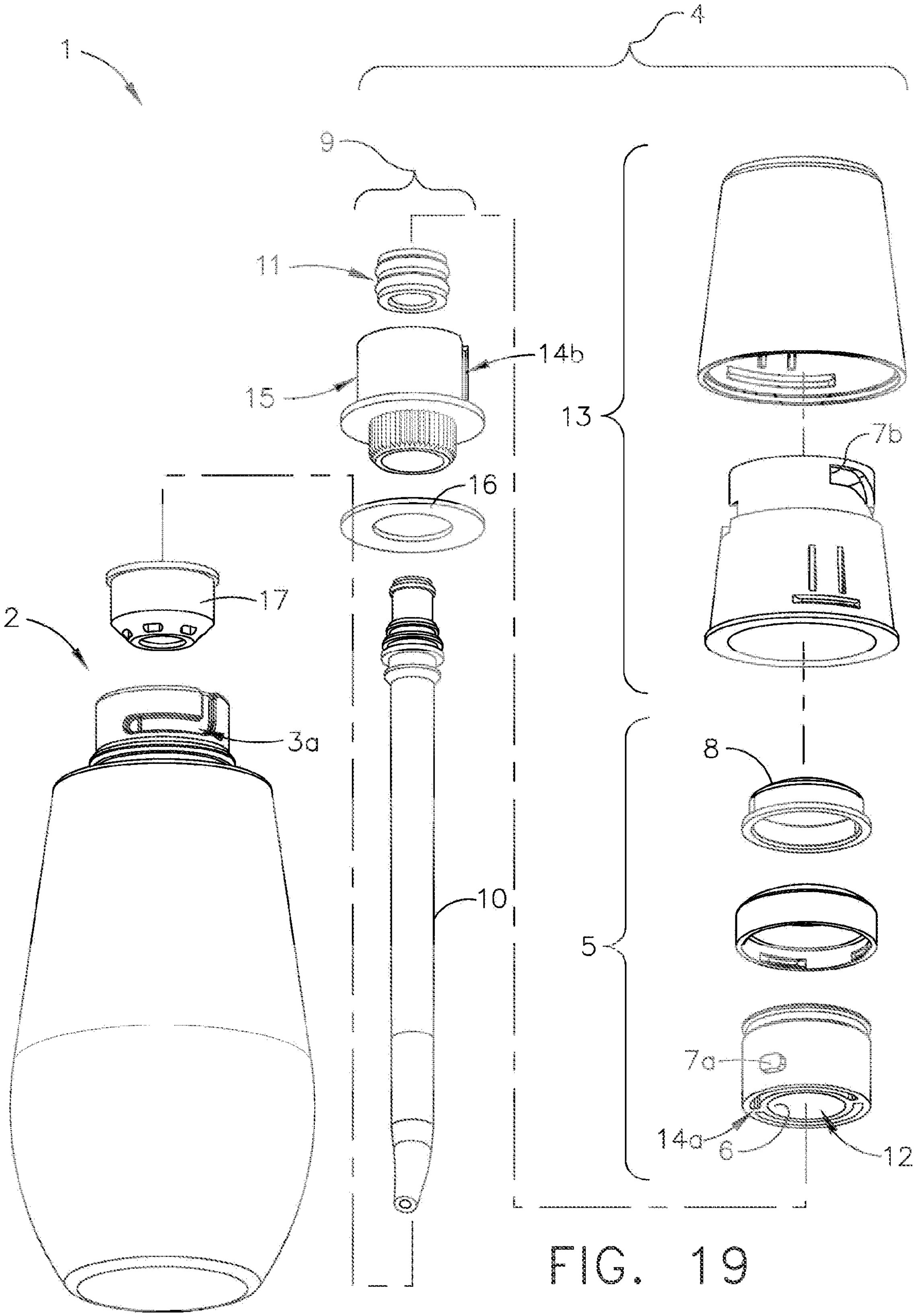
FIG. 19 illustrates an exploded perspective view of the dispenser of FIG. 18.
Figure 20:
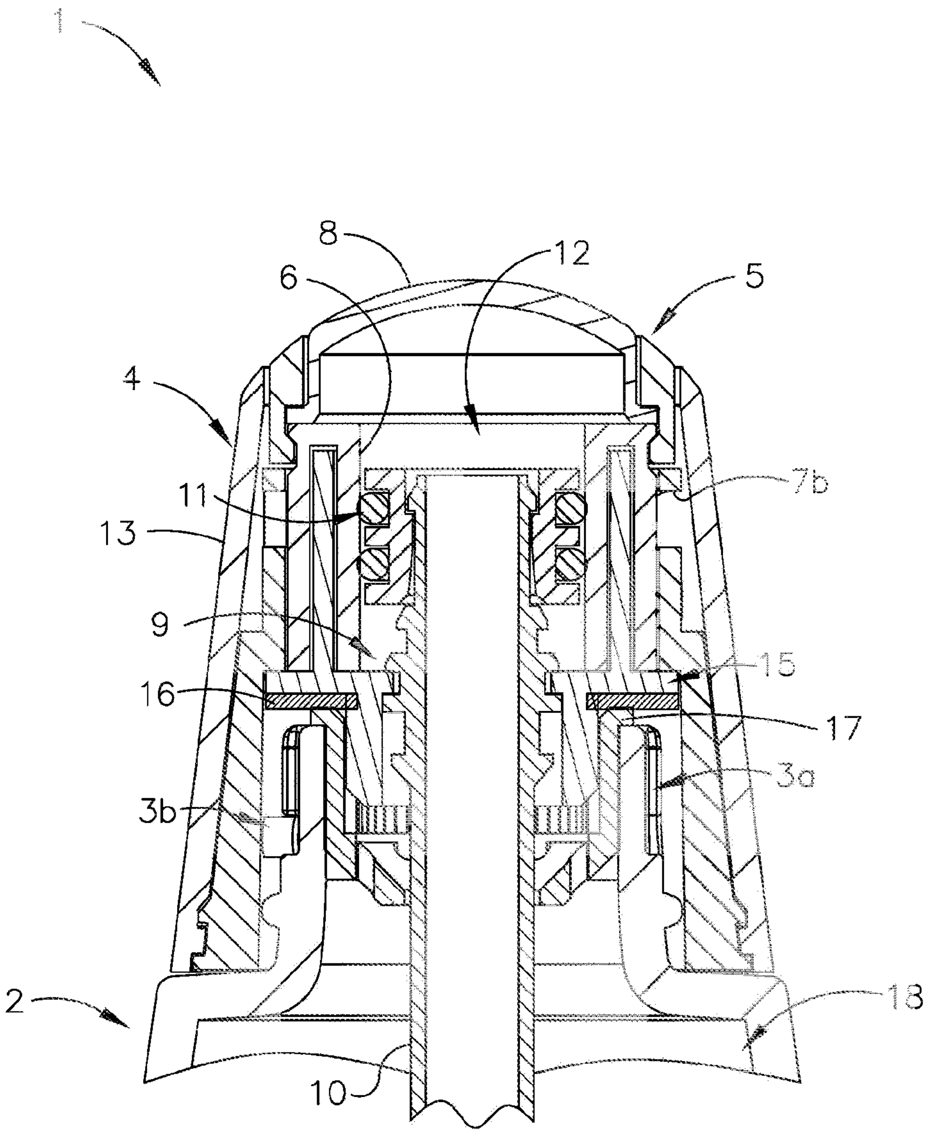
FIG. 20 illustrates a longitudinal cross-sectional view of the dispenser of FIG. 18, focusing on cap, in cap-closed position.

As shown in FIG. 13 and FIG. 16, a movement of the cap (4) in a direction of opening the product dispenser, which is pulling up of the outer cover (13) in this second embodiment, causes the housing (6) to move up relatively to the sealing element (11) via the chamber volume controlling mechanism (7*a*), so that the sealing element (11) slides from the higher to the lower position in the housing (6) and the volume of the chamber (12) increases, wherein this increase of the chamber volume causes a suction of the product in the pipette (10). When the housing (6) in the first assembly (5) is moved up relatively to the sealing element (11) in the second assembly (9), the second assembly (9) has no vertical displacement relatively to the reservoir.

Figure 14:
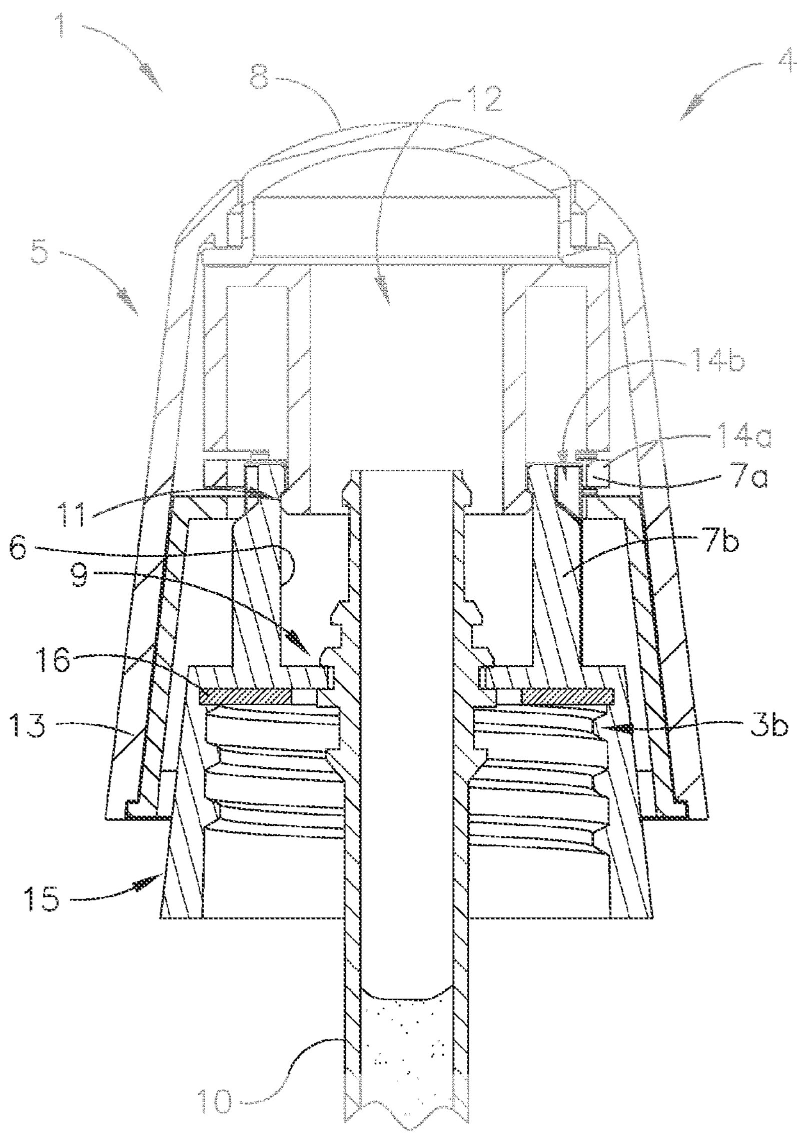
FIG. 14 illustrates a longitudinal cross-sectional view of the dispenser of FIG. 10, focusing on cap, in a cap-open position.
Figure 17:
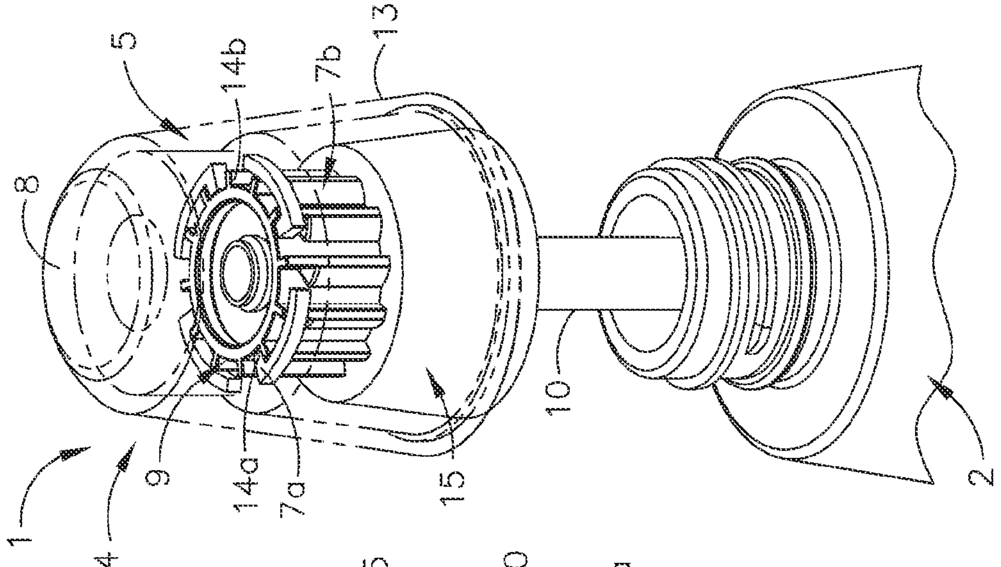
FIGS. 15-17 illustrate transparent views of the cap focusing on the locking feature, corresponding to different operation stages of the dispenser explained in FIGS. 12-14.

As shown in FIG. 14 and FIG. 17, when the sealing element (11) reaches to the lower position in the housing (6), the first and second assemblies (5, 9) are mechanically biased such that the first and second assemblies (5, 9) move together. The chamber volume controlling mechanism (7*a*) and corresponding chamber volume controlling mechanism (7*b*) have a locking feature (14*a*) and corresponding locking feature (14*b*) which help, when the sealing element (11) reaches to the lower position in the housing (6), the first and second assemblies (5, 9) move together during the further movement of the cap (4) in the direction of opening which is a rotation of the outer cover (13) in this second embodiment. In this second embodiment, the corresponding locking feature (14*b*) is a flange at the end of the rachet, and the chamber volume controlling mechanism (7*a*) which is one or more pawl(s) also works as the locking feature (14*a*).

Third Embodiment

FIG. 18-FIG. 25 illustrate one embodiment of the dispenser (1) of the present invention (hereinafter "third embodiment").

In this third embodiment, the cap fastening mechanism (3*a*) is a bayonet cam and the corresponding fastening mechanism (3*b*) is a nub engaging with the cam.

The cap (4) also has an outer cover (13) having a corresponding chamber volume controlling mechanism (7*b*). In this third embodiment, the corresponding chamber volume controlling mechanism (7*b*) is a rotatory sleeve with one or more rail(s), and the chamber volume controlling mechanism (7*a*) is one or more follower(s) engaging with each rail.

Figure 21:
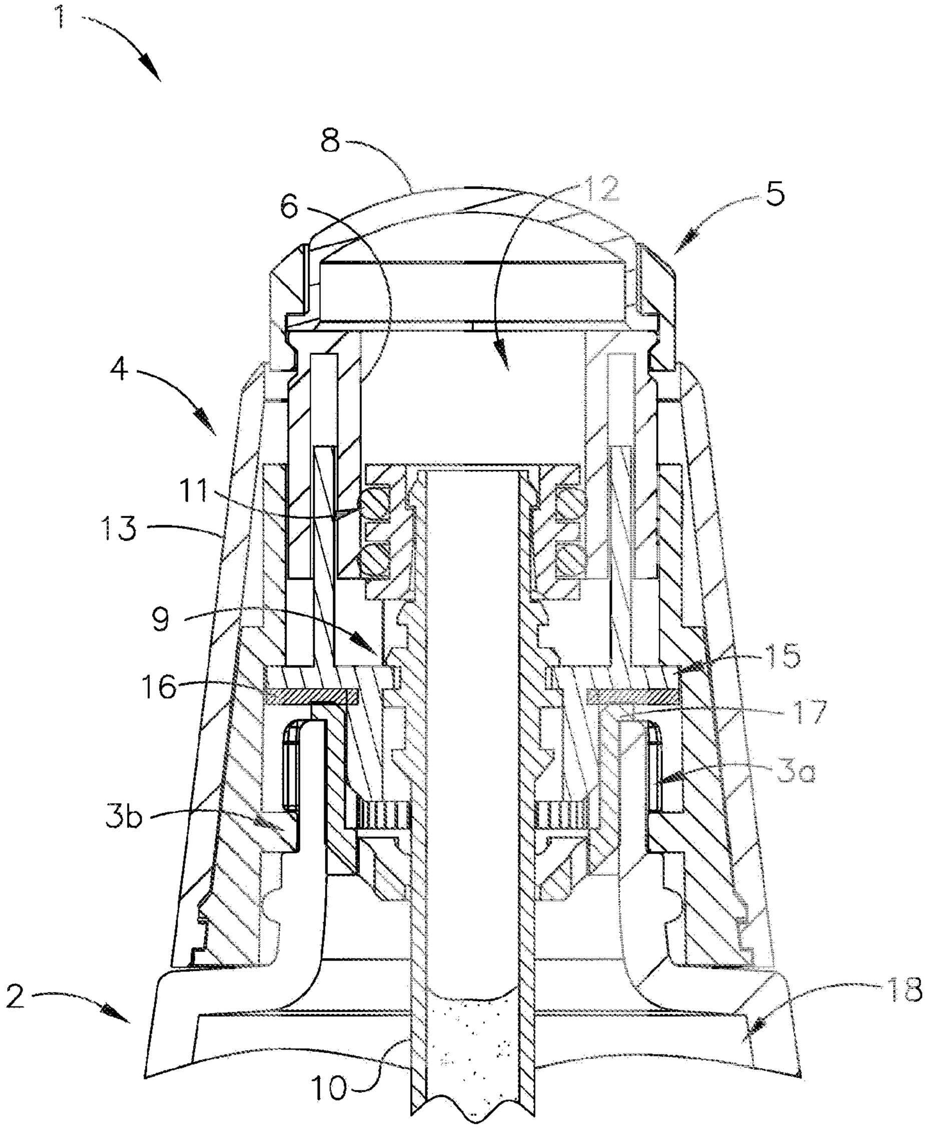
FIG. 21 illustrates a longitudinal cross-sectional view of the dispenser of FIG. 18, focusing on cap, in a loading position.
Figure 24:
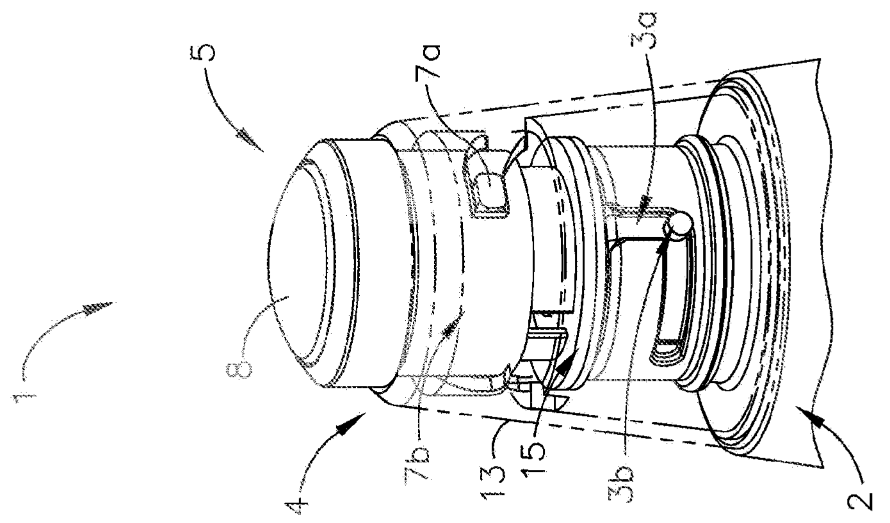

As shown in FIG. 21 and FIG. 24, a movement of the cap (4) in a direction of opening the product dispenser, which is a rotation of the outer cover (13) in this third embodiment, causes the housing (6) to move up relatively to the sealing element (11) via the chamber volume controlling mechanism (7*a*), so that the sealing element (11) slides from the higher to the lower position in the housing (6) and the volume of the chamber (12) increases, wherein this increase of the chamber volume causes a suction of the product in the pipette (10). When the housing (6) in the third assembly is moved up relatively to the sealing element (11) in the second assembly (9), the second assembly (9) has no vertical displacement relatively to the reservoir.

Figure 22:
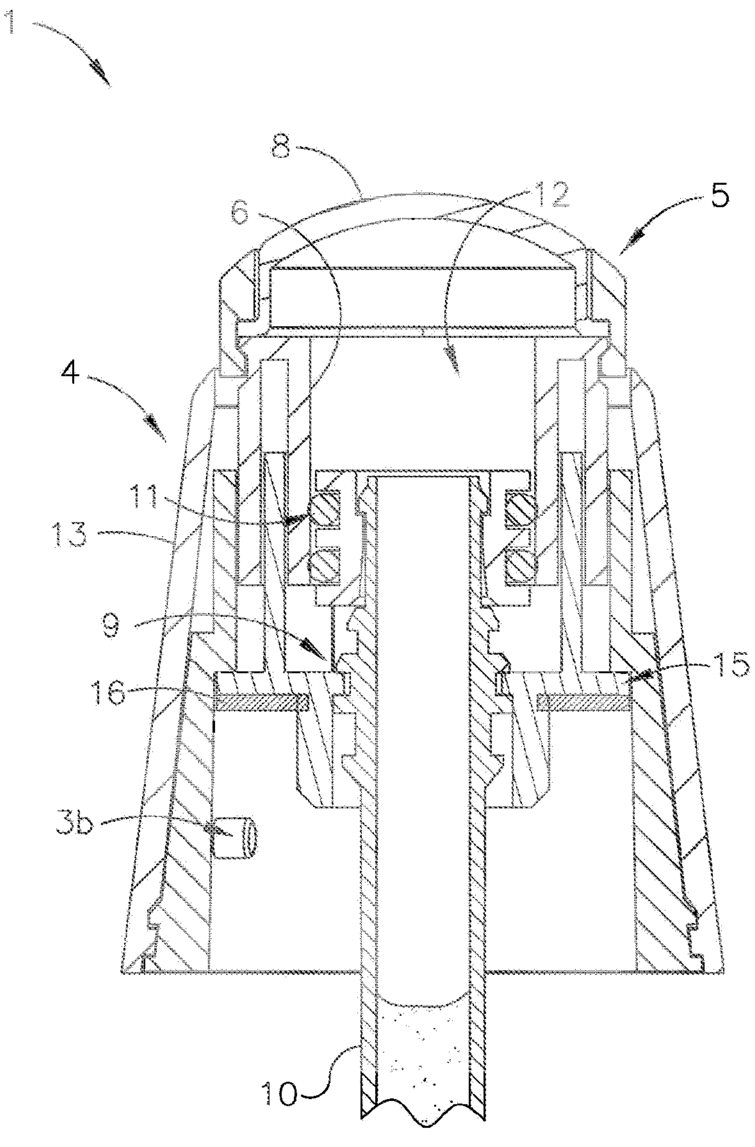
FIG. 22 illustrates a longitudinal cross-sectional view of the dispenser of FIG. 18, focusing on cap, in a cap-open position.
Figure 23:
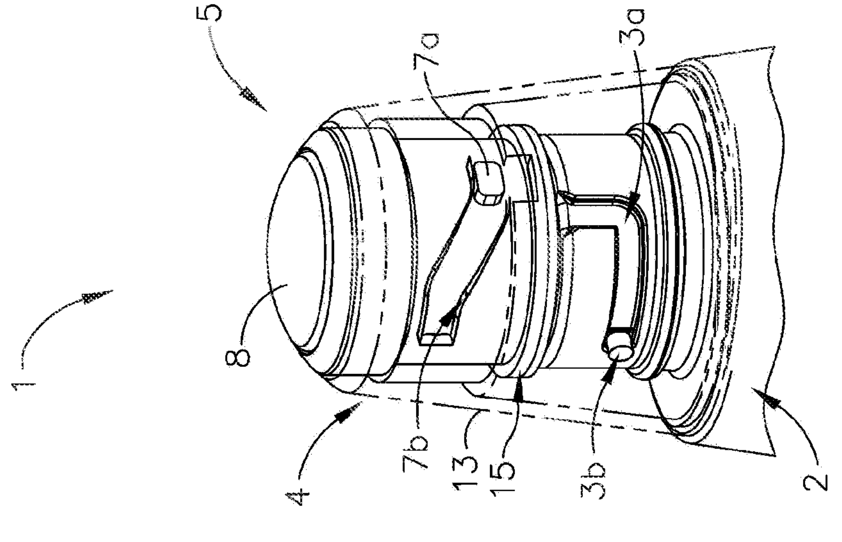
FIGS. 23-25 illustrate transparent views of the cap focusing on the locking feature, corresponding to different operation stages of the dispenser explained in FIGS. 20-22.
Figure 25:
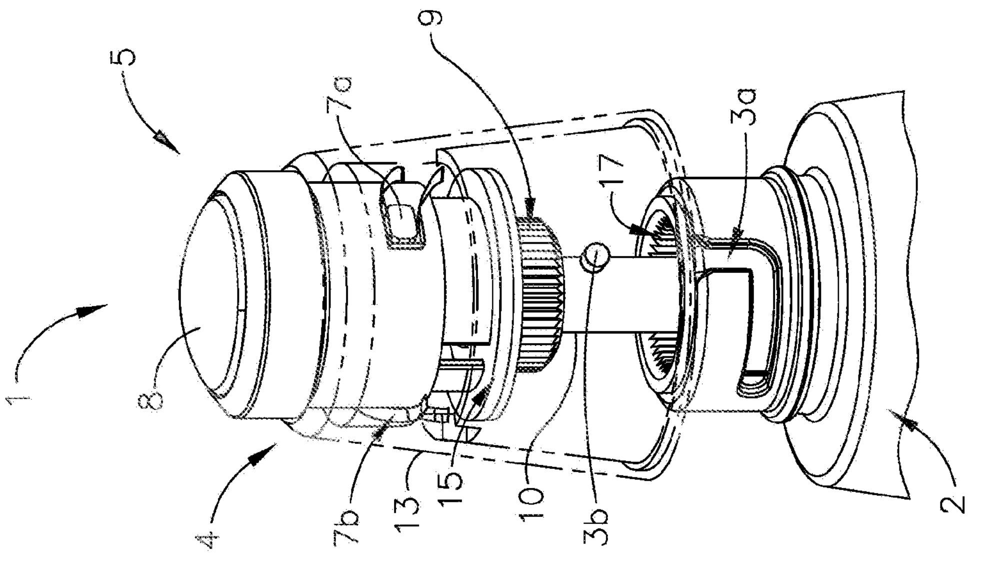
Figure 26:
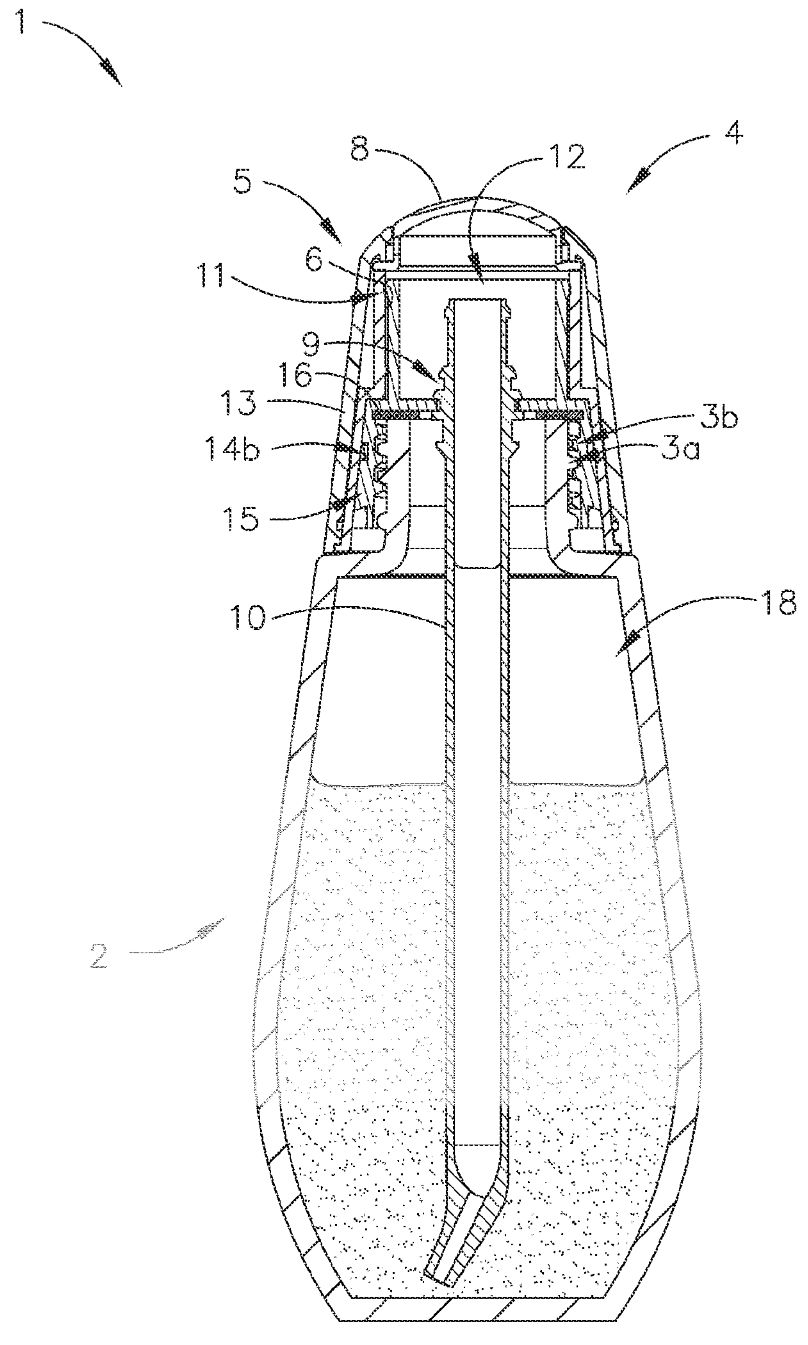
FIG. 26 illustrates a longitudinal cross-sectional view of a dispenser according to the fourth embodiment of the present invention, in a cap-closed position.
Figure 27:
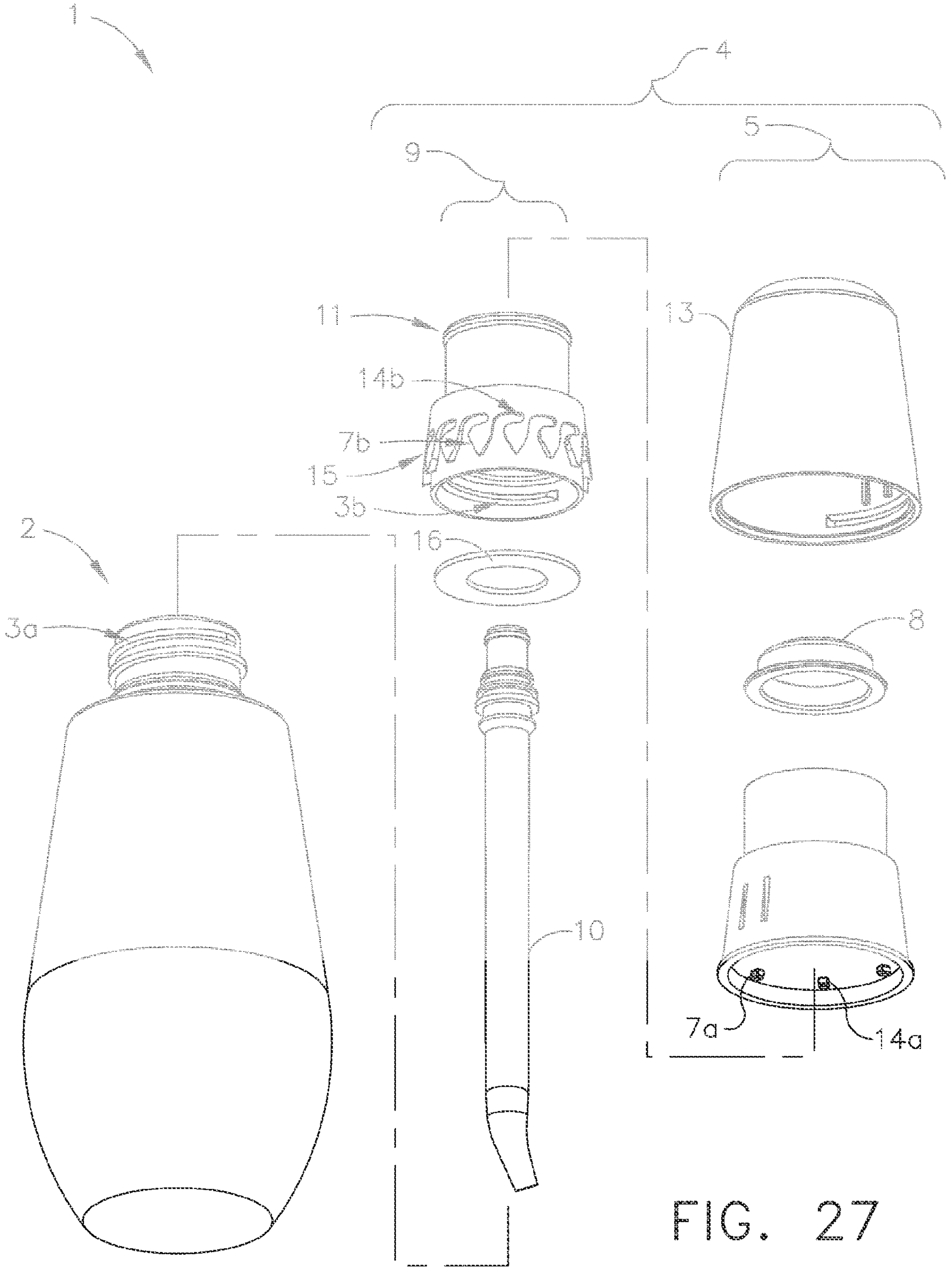
FIG. 27 illustrates an exploded perspective view of the dispenser of FIG. 26.
Figure 28:
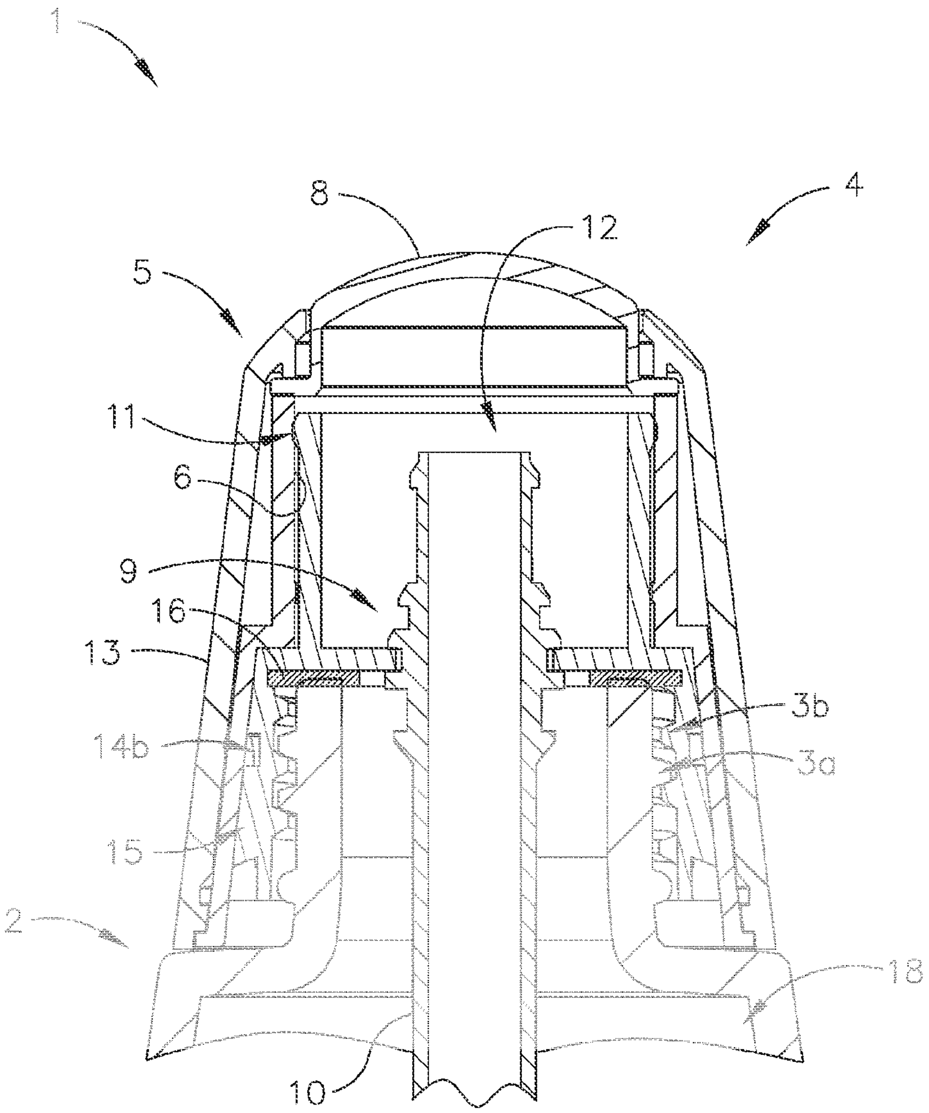
FIG. 28 illustrates a longitudinal cross-sectional view of the dispenser of FIG. 26, focusing on cap, in cap-closed position.

As shown in FIG. 22 and FIG. 25, when the sealing element (11) reaches to the lower position in the housing (6), the first and second assemblies (5, 9) are mechanically biased such that the first and second assemblies (5, 9) move together.

In this embodiment, the cap insert (15) outer wall includes a corresponding locking feature (14*b*) and the housing (6) includes a locking feature (14*a*). The corresponding locking feature (14*b*) can be one or more slots. The locking feature (14*a*) can be one or more ribs or keys built between the housing inner and outer wall. This locking feature (14*a*) allows the first assembly (5) to move vertically relatively to the second assembly (9) during the loading. Once the follower which is the chamber volume controlling mechanism (7*a*) has reached the end position in its respective rail which is the corresponding chamber volume controlling mechanism (7*b*) (at the end of the loading), the locking feature (14*a*) and corresponding locking feature (14*b*) assures that the first and second assembly (5, 9) are mechanically biased such that a further rotation of the outer cover (13) relatively to the reservoir (2) causes the corresponding cap fastening mechanism (3*b*) to disengage from the cap fastening mechanism (3*a*) of the reservoir (2).

In this embodiment, the reservoir (2) includes a neck insert; wherein said neck insert includes one or more wiping surfaces interfering with the pipette (10) to remove excess product on the surface; and wherein said insert further includes the mechanism engaging with the second assembly (9). Said neck insert mechanism is made of one or more ribs In this embodiment, the second assembly (9) includes a plug (17); wherein said plug (17) is hollow so that the pipette (10) is in fluidic connection to chamber (12); and wherein said plug (17) includes a mechanism engaging with the neck insert and wherein said mechanism is made of one or more ribs, so that the plug (17) and the neck insert can move vertically but cannot rotate relatively to each other. In this embodiment, said plug (17) includes one or more slots and wherein the housing (6) includes one or more ribs which can move vertically but cannot rotate relatively to the plug slots.

Fourth Embodiment

FIG. 26-FIG. 33 illustrate one embodiment of the dispenser (1) of the present invention (hereinafter "Fourth embodiment").

In this embodiment, the corresponding chamber volume controlling mechanism (7*b*) is a cam path in the second assembly (9) especially in the sealing element (11), and the chamber volume controlling mechanism (7*a*) is a bead engaging with the cam path.

Figure 29:
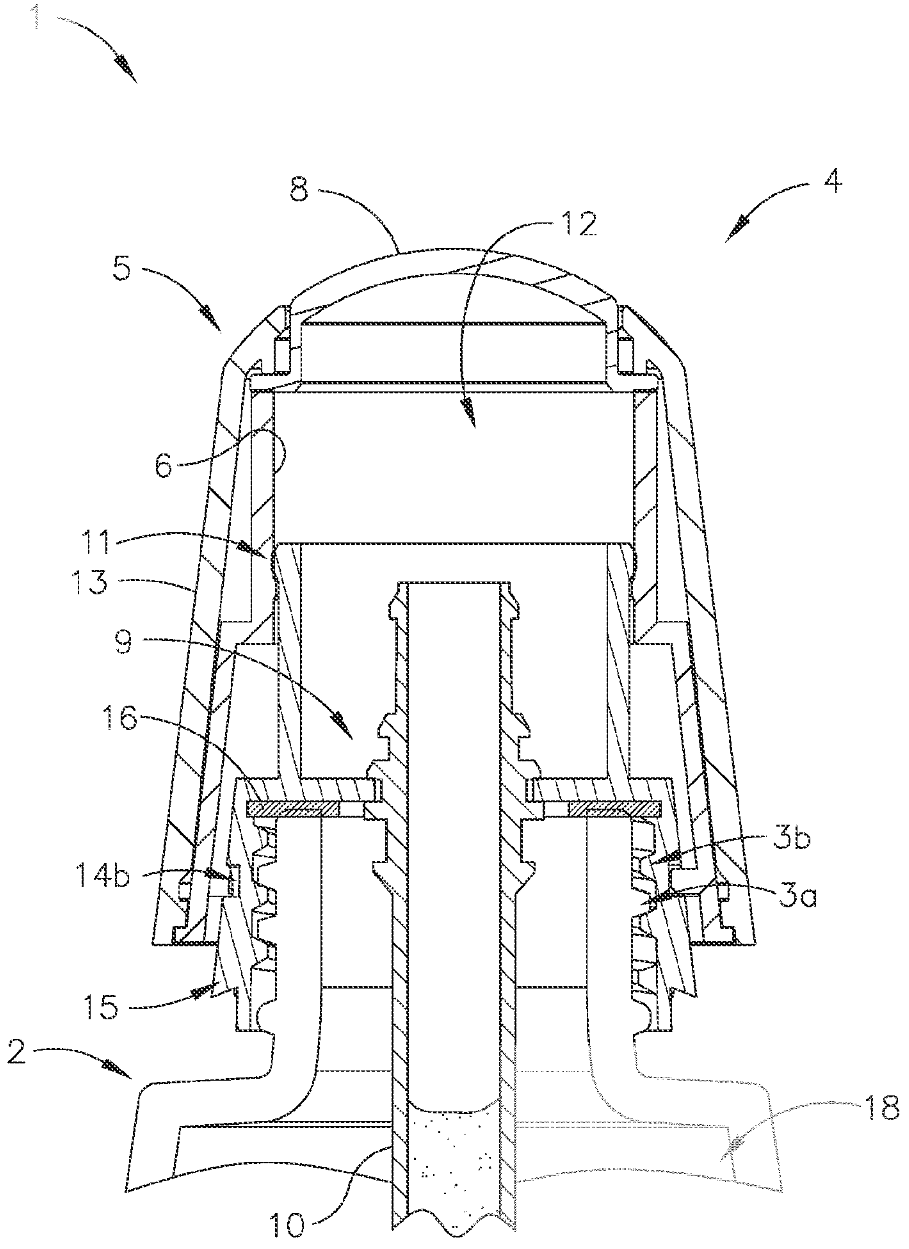
FIG. 29 illustrates a longitudinal cross-sectional view of the dispenser of FIG. 26, focusing on cap, in a loading position.
Figure 32:
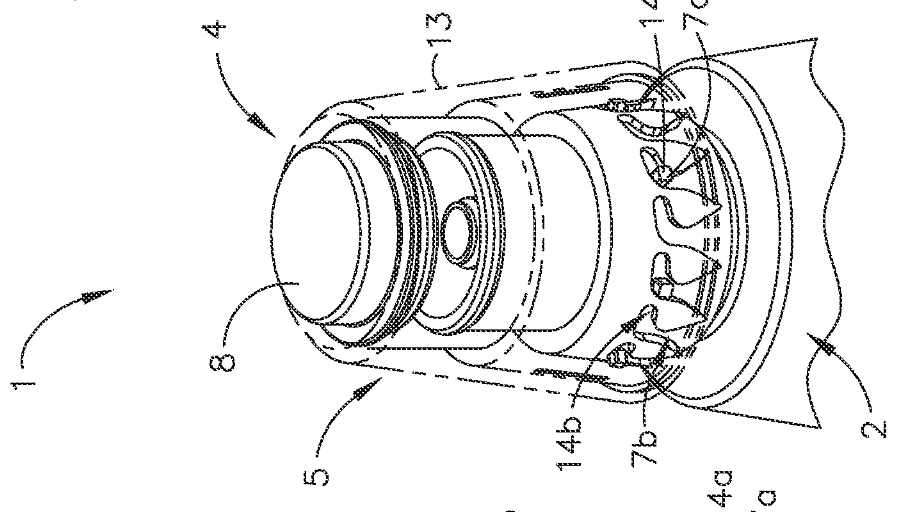
Figure 31:
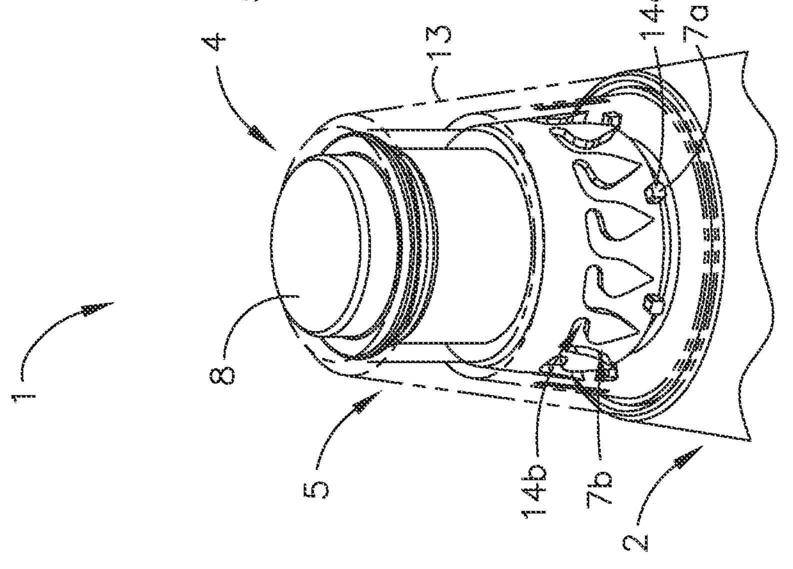

As shown in FIG. 29 and FIG. 32, the movement of the cap (4) in a direction of opening the product dispenser, which is pulling up of the outer cover (13) in this fourth embodiment, causes the housing (6) to move up relatively to the sealing element (11) via the chamber volume controlling mechanism (7*a*), so that the sealing element (11) slides from the higher to the lower position in the housing (6) and the volume of the chamber (12) increases, wherein this increase of the chamber volume causes a suction of the product in the pipette (10). When the housing (6) in the first assembly (5) is moved up relatively to the sealing element (11) in the second assembly (9), the second assembly (9) has no vertical displacement relatively to the reservoir.

Figure 30:
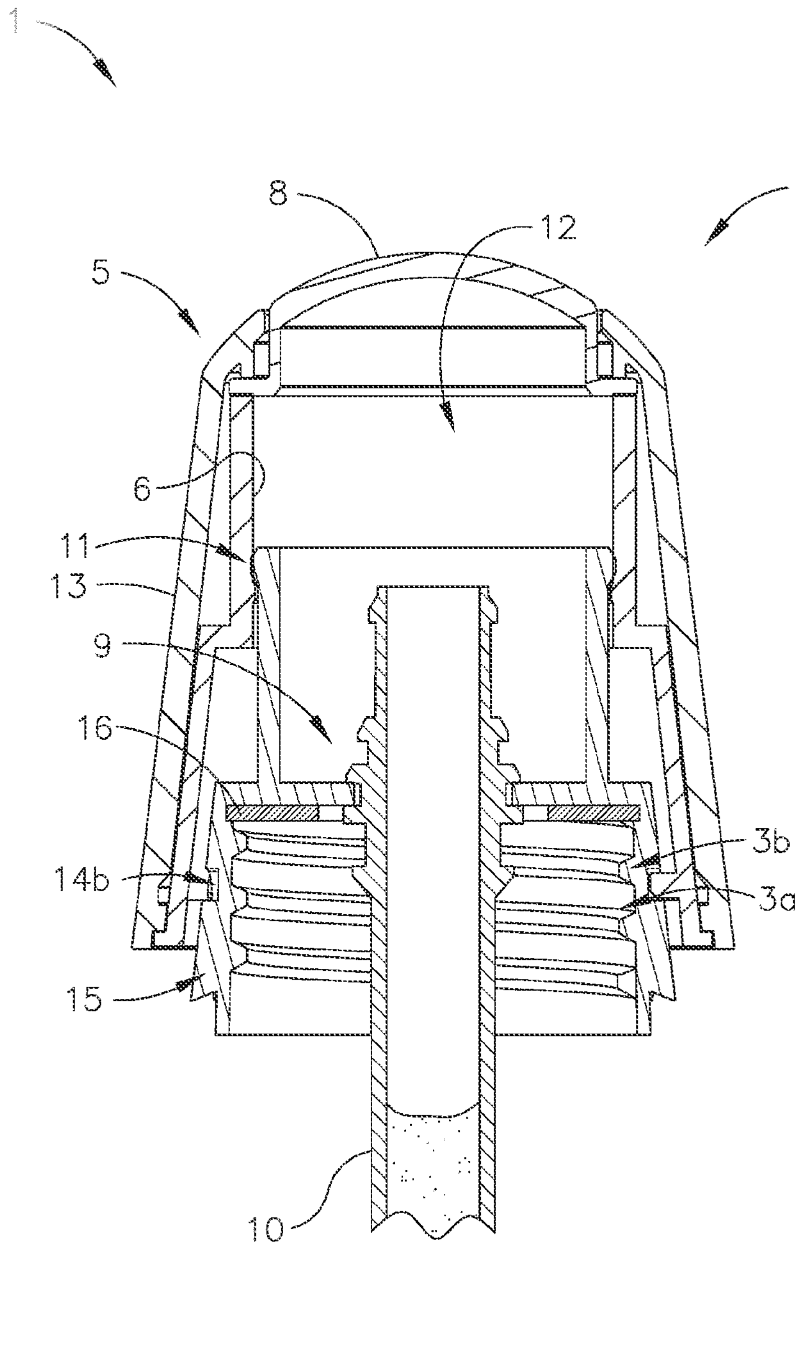
FIG. 30 illustrates a longitudinal cross-sectional view of the dispenser of FIG. 26, focusing on cap, in a cap-open position.
Figure 33:
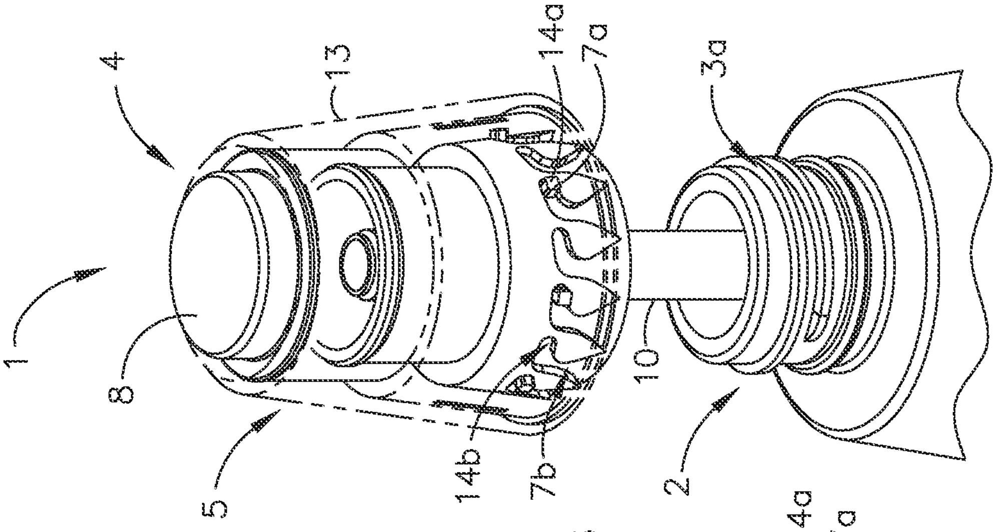
FIGS. 31-33 illustrate transparent views of the cap focusing on the locking feature, corresponding to different operation stages of the dispenser explained in FIGS. 28-30.

As shown in FIG. 30 and FIG. 33, when the sealing element (11) reaches to the lower position in the housing (6), the first and second assemblies (5, 9) are mechanically biased such that the first and second assemblies (5, 9) move together. The chamber volume controlling mechanism (7*a*) and corresponding mechanism (7*b*) have a locking feature (14*a*) and a corresponding locking feature (14*b*) which helps, when the sealing element (11) reaches to the lower position in the housing (6), the first and second assemblies (5, 9) move together during the further movement of the cap (4) in the direction of opening which is a rotation of the outer cover (13) in this fourth embodiment. In this fourth embodiment, the locking feature (14*a*) is same as the chamber volume controlling mechanism (7*a*) which is a bead, and the corresponding locking feature (14*b*) is a locking slot at the end of the cam path.

Combinations

1. A product dispenser, comprising:

(A) a reservoir for a product, having a cap fastening mechanism, (B) a cap having the following (B-1) to (B-3):

(B-1) a first assembly having:

a housing for a sealing element;

a chamber volume controlling mechanism; and a button configured to dispense the product through a lower end orifice of the pipette, when the button is actuated;

(B-2) a second assembly having:

a pipette having an upper end orifice and a lower end orifice, and rigidly connected and in fluidic communication with a chamber;

a sealing element configured to seal relative to the housing, and to slide between a high position and a low position in the housing a corresponding fastening mechanism to the cap fastening mechanism of the reservoir;

(B-3) a chamber configured to change its volume depending on the movement of the first assembly relative to the second assembly and the movement of the button;

wherein when the cap is in a closed position, the sealing element is located at a higher position relative to the housing, wherein a movement of the cap in a direction of opening the product dispenser causes the housing to move up relatively to the sealing element via the chamber volume controlling mechanism, so that the sealing element slides from the higher to the lower position in the housing and the volume of the chamber increases, wherein this increase of the chamber volume causes a suction of the product in the pipette, wherein when the sealing element reaches to the lower position in the housing, a further movement of the cap in the direction of opening causes the corresponding fastening mechanism of the cap to disengage from the cap fastening mechanism of the reservoir, wherein when the button is actuated, the volume of the chamber decreases by which the product is dispensed from the pipette.

2. The product dispenser according to the preceding feature, wherein when the housing in the first assembly is moved up relatively to the sealing element in the second assembly, the second assembly has no vertical displacement relatively to the reservoir.

3. The product dispenser according to any of the preceding features, wherein the cap further comprises (B-4) an outer cover 4. The product dispenser according to any of the preceding features, wherein either the outer cover or the second assembly has a corresponding chamber volume controlling mechanism.

5. The product dispenser according to any of the preceding features, wherein when the sealing element reaches to the lower position in the housing, the first and second assemblies are mechanically biased to move together upon a further movement of the cap in the direction of the opening 6. The product dispenser according to any of the preceding features, wherein the first assembly has a locking feature which mechanically bias the second assembly when the sealing element reaches to the lower position in the housing, such that the first and second assemblies to move together upon a further movement of the cap in the direction of opening.

7. The product dispenser according to any of the preceding features, wherein the second assembly has a corresponding locking feature.

8. The product dispenser according to any of the preceding features, wherein when the sealing element reaches to the lower position in the housing, the outer cover and the first assembly are mechanically biased to move together upon a further movement of the cap in the direction of the opening.

9. The product dispenser of any of the preceding features, wherein the sealing element is piston and the piston has a hollow manifold a hollow section to let the pipette through so the pipette can be in fluidic communication between the reservoir inner volume and the chamber.

10. The product dispenser of any of the preceding features, wherein the button is made of an elastic material, and can deform when pressed and restore to its original figure/position after stop pressing.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A product dispenser, comprising:

a. a reservoir for a product, having a cap fastening mechanism, b. a cap comprising:

i. a first assembly comprising:

1. a housing for a sealing element;
2. a chamber volume controlling mechanism; and
3. a button configured to dispense the product through a lower end orifice of a pipette, when the button is actuated;

ii. a second assembly comprising:

1. the pipette having an upper end orifice and the lower end orifice, and rigidly connected and in fluidic communication with a chamber;
2. the sealing element configured to seal relative to the housing, and to slide between a high position and a low position in the housing; a corresponding fastening mechanism to the cap fastening mechanism of the reservoir;
3. the chamber configured to change the chamber volume depending on movement of the first assembly relative to the second assembly and movement of the button;

wherein when the cap is in a closed position, the sealing element is located at a higher position relative to the housing, wherein a movement of the cap in a direction of opening the product dispenser causes the housing to move up relatively to the sealing element via the chamber volume controlling mechanism, so that the sealing element slides from the higher to the lower position in the housing and the volume of the chamber increases, wherein the increase of the chamber volume causes a suction of the product in the pipette, wherein when the sealing element reaches to the lower position in the housing, a further movement of the cap in the direction of opening causes the corresponding fastening mechanism of the cap to disengage from the cap fastening mechanism of the reservoir, wherein when the button is actuated, the volume of the chamber decreases by which the product is dispensed from the pipette.

2. The product dispenser according to claim 1, wherein when the housing in the first assembly is moved up relatively to the sealing element in the second assembly, the second assembly has no vertical displacement relatively to the reservoir.

3. The product dispenser according to claim 1, wherein the cap further comprises an outer cover.

4. The product dispenser according to claim 3, wherein either the outer cover or the second assembly has a corresponding chamber volume controlling mechanism.

5. The product dispenser according to claim 1, wherein when the sealing element reaches to the lower position in the housing, the first and second assemblies are mechanically biased to move together upon a further movement of the cap in the direction of the opening.

6. The product dispenser according to claim 1, wherein the first assembly has a locking feature which mechanically bias the second assembly when the sealing element reaches to the lower position in the housing, such that the first and second assemblies to move together upon a further movement of the cap in the direction of opening.

7. The product dispenser according to claim 6, wherein the second assembly has a corresponding locking feature.

8. The product dispenser according to claim 3, wherein when the sealing element reaches to the lower position in the housing, the outer cover and the first assembly are mechanically biased to move together upon a further movement of the cap in the direction of the opening.

9. The product dispenser of claim 1, wherein the sealing element is a piston and the piston has a hollow manifold a hollow section to let the pipette through so the pipette can be in fluidic communication between the reservoir inner volume and the chamber.

10. The product dispenser of claim 1, wherein the button is made of an elastic material, and can deform when pressed and restore to an original figure/position after stop pressing.

* * * * *